(12) United States Patent
Nakazawa et al.

(10) Patent No.: US 9,396,087 B2
(45) Date of Patent: Jul. 19, 2016

(54) METHOD AND APPARATUS FOR COLLECTING PERFORMANCE DATA, AND SYSTEM FOR MANAGING PERFORMANCE DATA

(75) Inventors: Takaaki Nakazawa, Kawasaki (JP);
Kenichi Shimazaki, Kawasaki (JP);
Seiya Shindo, Kawasaki (JP); Koutarou Tsuro, Kawasaki (JP); Takeo Iizuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 922 days.

(21) Appl. No.: 13/526,969

(22) Filed: Jun. 19, 2012

(65) Prior Publication Data

US 2012/0259588 A1  Oct. 11, 2012

Related U.S. Application Data

(63) Continuation of application No. PCT/JP2009/071477, filed on Dec. 24, 2009.

(51) Int. Cl.
*G06F 11/30* (2006.01)
*G06F 11/34* (2006.01)
*H04L 12/26* (2006.01)

(52) U.S. Cl.
CPC ........ *G06F 11/3476* (2013.01); *G06F 11/3495* (2013.01); *H04L 12/2602* (2013.01); *H04L 43/00* (2013.01); *H04L 43/065* (2013.01); *H04L 43/0817* (2013.01); *G06F 11/3409* (2013.01)

(58) Field of Classification Search
CPC .................................................. G06F 11/3476
See application file for complete search history.

(56) References Cited

U.S. PATENT DOCUMENTS

| | | | | |
|---|---|---|---|---|
| 6,370,536 B1* | 4/2002 | Suzuki | .............. | G06F 17/30899 707/693 |
| 2004/0210418 A1* | 10/2004 | Fukuda | ............... | G06F 11/3442 702/182 |
| 2006/0277295 A1 | 12/2006 | Masuda et al. | | |

(Continued)

FOREIGN PATENT DOCUMENTS

| | | |
|---|---|---|
| JP | 2000-172721 | 6/2000 |
| JP | 2006-338543 | 12/2006 |

(Continued)

OTHER PUBLICATIONS

Patent Abstracts of Japan, Publication No. 2000-172721, Published Jun. 23, 2000.

(Continued)

*Primary Examiner* — Hyun Park
(74) *Attorney, Agent, or Firm* — Staas & Halsey LLP

(57) ABSTRACT

A performance data collection unit collects the performance data of managed CPUs from a performance measurement unit. A grouping unit compares the collected performance data with each other, forms groups of CPUs whose performance data is approximate to each other, and selects a representative CPU of each group. A performance data transmission unit transmits the collected performance data to a performance data management apparatus that accumulates and manages the performance data. In this connection, the performance data of the representative CPUs of the groups is transmitted at specified transmission intervals, and the performance data of the other CPUs of the groups is transmitted at transmission intervals that are longer than the specified transmission intervals.

10 Claims, 22 Drawing Sheets

(56) References Cited

U.S. PATENT DOCUMENTS

| | | | |
|---|---|---|---|
| 2007/0185990 A1* | 8/2007 | Ono | G06F 11/3409 709/224 |
| 2007/0220139 A1 | 9/2007 | Ohta et al. | |
| 2007/0283091 A1 | 12/2007 | Nagae et al. | |

FOREIGN PATENT DOCUMENTS

| JP | 2007-207173 | 8/2007 |
|---|---|---|
| JP | 2007-257049 | 10/2007 |
| JP | 2007-323560 | 12/2007 |

OTHER PUBLICATIONS

Patent Abstracts of Japan, Publication No. 2007-207173, Published Aug. 16, 2007.
Patent Abstracts of Japan, Publication No. 2006-338543, Published Dec. 14, 2006.
Patent Abstracts of Japan, Publication No. 2007-323560, Published Dec. 13, 2007.
Patent Abstracts of Japan, Publication No. 2007-257049, Published Oct. 4, 2007.
International Search Report dated Mar. 16, 2010 in PCT/JP2009/071477.

\* cited by examiner

| CPU | GROUP ID | SIMILARITY LEVEL | REPRESENTATIVE CPU |
|---|---|---|---|
| CPU0 | 1 | 2 | 1 |
| CPU1 | 1 | 2 | 0 |
| CPU2 | 1 | 2 | 0 |
| CPU3 | 2 | 1 | 1 |
| CPU4 | 2 | 1 | 0 |
| CPU5 | 3 | 2 | 1 |
| CPU6 | 3 | 2 | 0 |
| CPU7 | 3 | 2 | 0 |

1130 GROUPING INFORMATION
1131  1132  1133  1134

FIG. 5

| TIME | CPU-ID | CPU UTILIZATION | REPRESENTATIVE CPU |
|---|---|---|---|
| 0:00 | CPU0 | 30% | |
| 0:00 | CPU3 | 40% | |
| 0:00 | CPU5 | 10% | |
| ⋮ | ⋮ | ⋮ | |

SPECIFIED INTERVALS

FIG. 13A

| TIME | CPU-ID | CPU UTILIZATION | REPRESENTATIVE CPU |
|---|---|---|---|
| 0:05 | CPU0 | 32% | |
| 0:05 | CPU1 | 30% | CPU0 |
| 0:05 | CPU2 | 30% | CPU0 |
| 0:05 | CPU3 | 40% | |
| 0:05 | CPU4 | 40% | CPU3 |
| ⋮ | ⋮ | ⋮ | ⋮ |

LONGER INTERVALS

FIG. 13B

TO MANAGER

1142 REPRESENTATIVE CPU (CPU0)

| TIME | CPU-ID | CPU UTILI-ZATION | REPRESEN-TATIVE CPU |
|---|---|---|---|
| 0:00 | CPU0 | 30% | |
| 0:01 | CPU0 | 35% | |
| 0:02 | CPU0 | 31% | |
| 0:03 | CPU0 | 32% | |
| 0:04 | CPU0 | 36% | |
| 0:05 | CPU0 | 33% | |
| 0:06 | CPU0 | 30% | |
| 0:07 | CPU0 | 31% | |
| 0:08 | CPU0 | 30% | |
| ... | ... | ... | ... |

1143 NON-REPRESENTATIVE CPU (CPU1)

| TIME | CPU-ID | CPU UTILI-ZATION | REPRESEN-TATIVE CPU |
|---|---|---|---|
| 0:00 | CPU1 | 30% | CPU0 |
| 0:05 | CPU1 | 30% | CPU0 |
| ... | ... | ... | ... |

1144 NON-REPRESENTATIVE CPU (CPU2)

| TIME | CPU-ID | CPU UTILI-ZATION | REPRESEN-TATIVE CPU |
|---|---|---|---|
| 0:00 | CPU2 | 30% | CPU0 |
| 0:05 | CPU2 | 30% | CPU0 |
| ... | ... | ... | ... |

1145

| TIME | CPU-ID | CPU UTILIZATION | OTHER CPUs |
|---|---|---|---|
| 0:00 | CPU0 | 30% | CPU1,CPU2 |
| 0:00 | CPU3 | 40% | CPU4 |
| 0:00 | CPU5 | 10% | CPU6,CPU7 |
| ⋮ | ⋮ | ⋮ | |

SPECIFIED INTERVALS

| TIME | CPU-ID | CPU UTILIZATION | OTHER CPUs |
|---|---|---|---|
| 0:05 | CPU0 | 32% | CPU1,CPU2 |
| 0:05 | CPU1 | 30% | |
| 0:05 | CPU2 | 30% | |
| 0:05 | CPU3 | 40% | CPU4 |
| 0:05 | CPU4 | 40% | |
| ⋮ | ⋮ | ⋮ | ⋮ |

LONGER INTERVALS

FIG. 15B

2131 PERFORMANCE DATA TABLE

| TIME | CPU-ID | CPU UTILIZATION | REPRESENTATIVE CPU |
|---|---|---|---|
| 0:00 | CPU0 | 30% | |
| 0:01 | CPU0 | 35% | |
| 0:02 | CPU0 | 31% | |
| 0:03 | CPU0 | 32% | |
| 0:04 | CPU0 | 36% | |
| 0:05 | CPU0 | 33% | |
| 0:06 | CPU0 | 30% | |
| 0:07 | CPU0 | 31% | |
| 0:00 | CPU1 | 30% | CPU0 |
| 0:05 | CPU1 | 32% | CPU0 |
| 0:00 | CPU2 | 30% | CPU0 |
| 0:05 | CPU2 | 32% | CPU0 |
| 0:00 | CPU3 | 40% | |
| ⋮ | ⋮ | ⋮ | ⋮ |

} CPU0
} CPU1
} CPU2

FIG. 16

2220  CPU UTILIZATION

| TIME | CPU-ID | CPU UTILIZATION |
|------|--------|-----------------|
| 0:00 | CPU0 | 30% |
| 0:01 | CPU0 | 35% |
| 0:02 | CPU0 | 31% |
| 0:03 | CPU0 | 32% |
| 0:04 | CPU0 | 36% |
| 0:05 | CPU0 | 33% |
| 0:06 | CPU0 | 30% |
| 0:07 | CPU0 | 31% |
| 0:00 | CPU1 | 30% |
| 0:01 | CPU1 | 35% |
| 0:02 | CPU1 | 31% |
| 0:03 | CPU1 | 32% |
| 0:04 | CPU1 | 36% |
| 0:05 | CPU1 | 32% |
| 0:06 | CPU1 | 30% |
| 0:07 | CPU1 | 31% |

2221

2223 REPRODUCED

2222

2224 REPRODUCED

FIG. 17

2132 PERFORMANCE DATA TABLE

| TIME | CPU-ID | CPU UTILIZATION | OTHER CPUs |
|---|---|---|---|
| 0:00 | CPU0 | 30% | CPU1,CPU2 |
| 0:01 | CPU0 | 35% | CPU1,CPU2 |
| 0:02 | CPU0 | 31% | CPU1,CPU2 |
| 0:03 | CPU0 | 32% | CPU1,CPU2 |
| 0:04 | CPU0 | 36% | CPU1,CPU2 |
| 0:05 | CPU0 | 33% | CPU1,CPU2 |
| 0:06 | CPU0 | 30% | CPU1,CPU2 |
| 0:07 | CPU0 | 31% | CPU1,CPU2 |
| 0:00 | CPU1 | 30% | |
| 0:05 | CPU1 | 32% | |
| ⋮ | ⋮ | ⋮ | ⋮ |

Rows for CPU0: 0:00–0:07
Rows for CPU1: 0:00, 0:05

METHOD AND APPARATUS FOR COLLECTING PERFORMANCE DATA, AND SYSTEM FOR MANAGING PERFORMANCE DATA

CROSS-REFERENCE TO RELATED APPLICATION

This application is a continuation application of International Application PCT/JP2009/071477, filed on Dec. 24, 2009 and designated the U.S., the entire contents of which are incorporated herein by reference.

FIELD

The embodiments discussed herein relate to a method and apparatus for collecting performance data of processors provided in computers, and a system for managing the performance data.

BACKGROUND

There are many computer systems where a computer performs parallel processing with multiple processors, and large-scale multiprocessor computer systems with large number of processors are widely used.

To operate a computer system, the performance data of resources making up the system needs to be periodically collected to analyze the system performance. To this end, there has been a performance data management system, for example, where the performance data of each computer (hereinafter, referred to as node) that is considered as one unit on a network is measured, and the performance data of the nodes is collected to a management apparatus which collectively manages the performance data. Then, the performance data thus accumulated in the management apparatus is analyzed, thereby making it possible to confirm the operating status of the system under operation.

Such a performance data management system, however, has a drawback in which, as the number of nodes increases, the amount of data to be transmitted from the nodes to a management apparatus becomes enormous. To deal with this, there has been a data collection method of grouping target nodes, setting sampling intervals for collecting performance data, and collecting as much performance data as possible from the nodes of the target node groups during collection periods between the respective sampling intervals. There has also been a performance analysis method for efficiently analyzing nodes by grouping the nodes according to acquired performance data and analyzing the performance data for each group. Please refer, for example, to Japanese Laid-open Patent Publications No. 2000-172721 and 2007-207173.

However, conventional performance data collection methods have a drawback in which, if the amount of performance data to be transmitted from nodes increases in a large-scale multi-processor environment, a process for managing the performance data has an adverse effect on the system operation.

To analyze the operating status of a system, execution-based performance data at the CPU level, such as processor (hereinafter, referred to also as Central Processing Unit (CPU)) utilization data or memory utilization data, is needed. However, in a large-scale multi-processor environment, many CPUs are installed on one node, and an enormous amount of performance data of the CPUs is collected and accumulated. Especially, in recent years, not only a multicore architecture which provides one processor with a plurality of cores, but also operating systems (OS) where a single core is used as a plurality of virtual cores so as to correspond to multithreads are prevailing. Such an OS executes processes on a thread basis, so that as many pieces of performance data as the number of threads, which are units of execution in a CPU, not as the number of physical CPUs, need to be collected. With respect to physical CPU cores, CPUs corresponding to threads are called logical CPUs. For example, in the case where there are eight CPU cores, and eight threads are allowed to be assigned to one CPU core, the number of logical CPUs is 64 at maximum. In this case, the performance data of the 64 logical CPUs is collected and transmitted to a management apparatus. In the following description, processors and CPUs refer to logical processors and logical CPUs that are units of execution in a CPU, unless expressly specified.

If the number of CPUs increases and the amount of performance data of the CPUs becomes enormous, a large storage region needs to be prepared in a storage apparatus for storing the performance data, which is a problem. In addition, the performance data transmitted from nodes to the management apparatus occupies a network bandwidth, which causes a delay in transmission of other data. That is to say, an increased amount of performance data increases the load of the performance data management, which may have an adverse effect on the system operation.

SUMMARY

According to an aspect, there is provided a performance data collection method including a first procedure executed by a computer. The first procedure includes: collecting performance data that is obtained by measuring a characteristic value of a logical processor of a processor core when the logical processor executes a process, the logical processor corresponding to a unit of execution and being provided in plurality; comparing the collected performance data of the plurality of logical processors with each other, forming a group of logical processors whose performance data falls within a predetermined range of approximation, selecting a representative processor of the group, and generating grouping information that indicates the logical processors of the group and the representative processor of the group in association with identification information of the group; and transmitting, to another computer, the performance data of the representative processor of the group at specified transmission intervals, and the performance data of logical processors other than the representative processor of the group at transmission intervals that are longer than the specified transmission intervals, with reference to the generated grouping information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of grouping information;

FIGS. 13A and 13B illustrate an example of data items of transmit data to be transmitted to a manager;

FIGS. 15A and 15B illustrate another example of data items of transmit data to be transmitted to the manager;

FIG. 16 illustrates an example of a performance data table to be stored in a performance data database;

FIG. 17 illustrates performance data (CPU utilization) to be displayed by an operation management client;

FIG. 18 illustrates another example of a performance data table to be stored in the performance data database;

DESCRIPTION OF EMBODIMENTS

Figure 1:
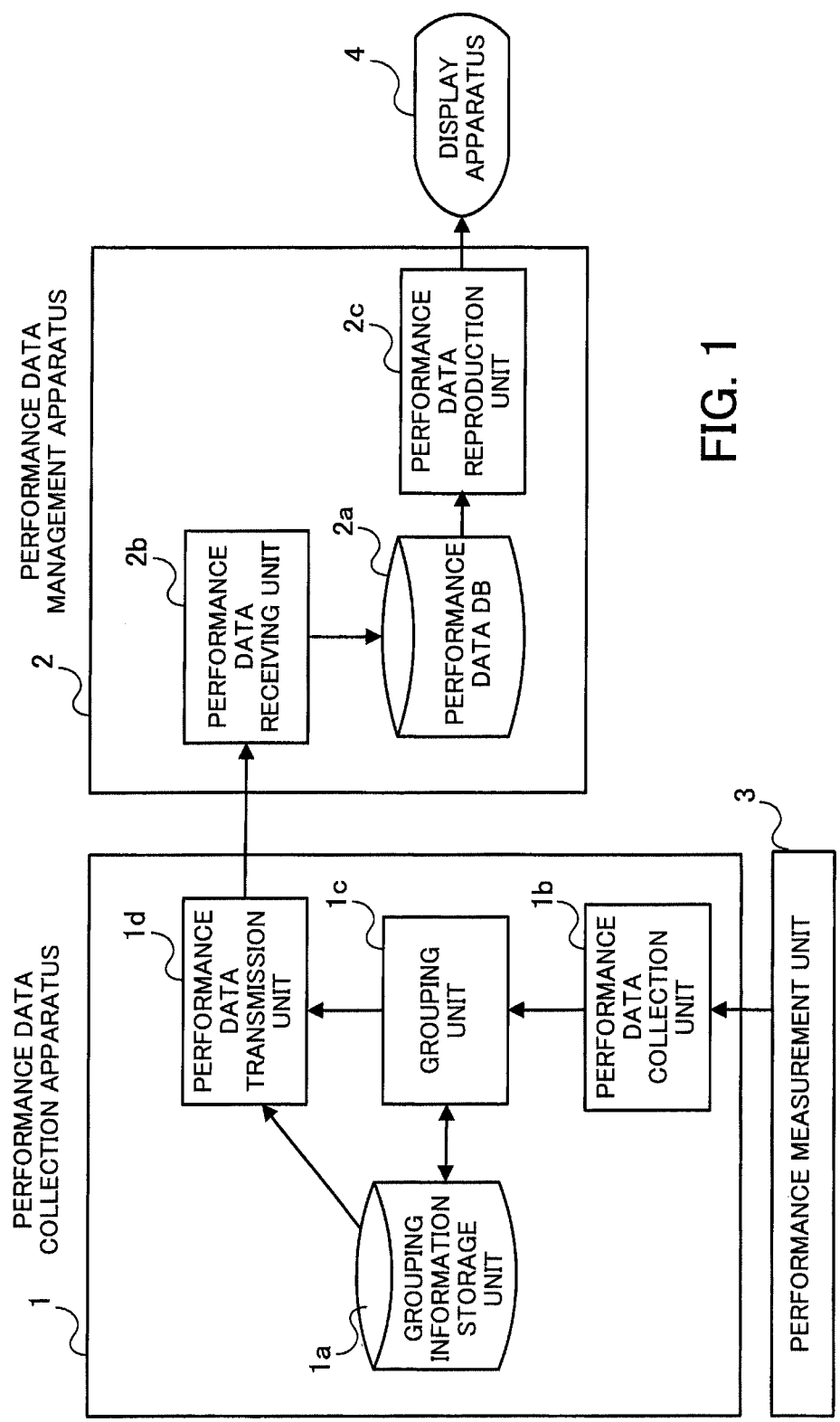
FIG. 1 illustrates an example configuration of a performance data management system according to a first embodiment.

Several embodiments will be described below with reference to the accompanying drawings, wherein like reference numerals refer to like elements throughout.

FIG. 1 illustrates an example configuration of a performance data management system according to a first embodiment.

A performance data management system includes a performance data collection apparatus 1 for collecting performance data of managed CPUs, and a performance data management apparatus 2 for accumulating and managing the performance data collected by the performance data collection apparatus 1. The performance data collection apparatus 1 and performance data management apparatus 2 are connected to each other over a network. In general, a plurality of performance data collection apparatuses are connected to a single performance data management apparatus.

The performance data collection apparatus 1 includes a grouping information storage unit 1a, a performance data collection unit 1b, a grouping unit 1c, and a performance data transmission unit 1d, and is connected to a performance measurement unit 3.

The grouping information storage unit 1a stores grouping information on CPU groups formed through grouping by the grouping unit 1c. The grouping information will be described in detail later.

The performance data collection unit 1b collects the performance data of CPUs of a managed computer at predetermined collection intervals. The managed computer has a multithreaded architecture, and the managed CPUs are logical CPUs corresponding to respective threads. When the collection interval expires, the performance data collection unit 1b collects the performance data of all managed logical CPUs measured by the performance measurement unit 3. The performance data includes at least execution-based measurement data that is obtained by measuring a characteristic value when a CPU executes a process. For example, measurement data to be obtained is CPU utilization data or memory utilization data. The collected performance data of the CPUs is supplied to the grouping unit 1c.

The grouping unit 1C compares the performance data of a plurality of managed CPUs, which was received from the performance data collection unit 1b, with each other and forms groups of CPUs whose performance data is within a range of approximation. For example, with the performance data of a CPU or a value calculated based on the performance data as a midpoint value, a range defined by predetermined positive and negative tolerance values is set as the range of approximation. All of CPUs whose performance data falls within this range of approximation are extracted and grouped. Then, one CPU is selected in each group as a representative CPU. The representative CPU is selected from among the CPUs of the group under predetermined rules. With respect to each of thus formed groups, grouping information indicating the CPUs belonging to the group and a representative CPU is generated and stored in association with the identification information of the group in the grouping information storage unit 1a.

The group members are dynamically changed according to a change in performance data. For example, if a result of comparing the performance data of the representative CPU of an existing group with the performance data of the representative CPU of another group indicates that both of the performance data fall within the range of approximation, these groups are combined. If the performance data of the representative CPU of an existing group and the performance data of a CPU which does not belong to any groups fall within the range of approximation, the CPU that does not belong to any groups is added to the existing group. An evaluation process for evaluating the validity of groups is performed at evaluation intervals. With the performance data of the representative CPU of a group as a reference, the evaluation process is performed for confirming whether or not the performance data of the other CPUs in the group falls within a range of approximation to the performance data of the representative CPU. If there is a CPU whose performance data is out of the range of approximation, this CPU is separated from the group. If the performance data of all CPUs other than the representative CPU is out of the range of approximation, this group is broken up. The evaluation interval is set equal to the collection interval for collecting performance data or equal to an integral multiple of the collection interval.

The performance data of the CPUs in a group formed through the above process lies within a range of approximation. While CPUs are used for the same purpose, for example, while the CPUs run the same application, these CPUs likely have similar performance characteristics, and their performance data tends to be approximate to each other. Therefore, the CPUs of a group formed by the grouping unit 1c may be used for the same purpose and their performance data may continue to be approximate to each other. The grouping unit 1c manages, as a similarity level, the possibility that the characteristic values of the processors in a group continue to be similar to each other. The similarity level is set based on how long performance characteristics continue to be similar. For example, when a group is newly formed, its similarity level is set to an initial value. Then, the similarity level is increased if a result of evaluating the validity of the group indicates that the similarity state continues, where the performance data of the CPUs of the group continues to fall within a range of approximation. The evaluation interval for evaluating the group validity may be changed according to the similarity level. A high similarity level of a group means that a representative CPU and the other CPUs have performance data approximate to each other for a long time, and the performance data is expected to stably fall within the range of approximation. In this case, the frequency of the evaluations is reduced. The calculated similarity level is registered in association with a corresponding group or the CPUs of the group in the grouping information.

The performance data transmission unit 1d transmits the performance data of the processors collected by the performance data collection unit 1b to the performance data management apparatus 2 with reference to the grouping information stored in the grouping information storage unit 1a. The performance data of the representative CPU of each group is transmitted at specified transmission intervals. On the other hand, the performance data of the CPUs other than the representative CPU of each group is transmitted at transmission intervals that are longer than the specified transmission intervals. A CPU that does not belong to any groups is treated as a representative CPU, considering that this CPU makes up a group by itself. By reducing the frequency of transmitting the performance data of the CPUs other than the representative CPU of each group, it becomes possible to reduce the amount of data to be transmitted to the performance data management apparatus 2. The transmission intervals for transmitting the performance data of the CPUs other than the representative CPU may be changed according to similarity level. In a group with a high similarity level, the performance data of the representative CPU and that of the other CPUs have a high degree of similarity. Even if the frequency of transmitting the performance data of the CPUs other than the representative CPU is reduced, the performance data during the transmission intervals may be approximately obtained by using the performance data of the representative CPU. Therefore, long transmission intervals are set for transmitting the performance data of the CPUs other than the representative CPU if the similarity level is high, and short transmission intervals are set if the similarity level is low.

The performance measurement unit 3 measures characteristic values when the managed CPUs execute processes, and stores the characteristic values as performance data. Then, in response to a read request from the performance data collection unit 1b, the performance measurement unit 3 provides the performance data. For example, execution-based measurement data obtained when a process is executed, such as a CPU load status such as CPU utilization, a disk load status, or a process execution status, is output as performance data.

The performance data management apparatus 2 includes a performance data database (DB) 2a, performance data receiving unit 2b, and performance data reproduction unit 2c, and is connected to a display apparatus 4.

The performance data database 2a is a database for accumulating and managing the performance data of CPUs obtained from the performance data collection apparatus 1.

The performance data receiving unit 2b receives the performance data of managed CPUs from the performance data collection apparatus 1, and stores the performance data in the performance data database 2a. The performance data transmission unit 1d transmits the performance data of the CPUs other than representative CPUs at a frequency lower than that of the specified transmission intervals. Therefore, as compared with the case of receiving the performance data of all CPUs at the specified transmission intervals, the performance data receiving unit 2b receives a smaller amount of data, which leads to a reduction in the amount of performance data to be stored in the performance data database 2a.

When displaying the performance data of managed CPUs on the display apparatus 4, the performance data reproduction unit 2c reproduces the performance data of the CPUs other than a representative CPU by using the performance data of the representative CPU. The performance data management apparatus 2 receives the performance data of the representative CPU at specified transmission intervals, and receives the performance data of the other CPUs at transmission intervals that are longer than the specified transmission intervals. Therefore, there occurs a time period during which the performance data of the representative CPU is acquired but the performance data of the other CPUs is not acquired. This time period that occurs with respect to the CPUs other than the representative CPU is referred to as a performance data blank period. The performance data reproduction unit 2c uses and displays, as the performance data of the CPUs other than a representative CPU for a blank period, the performance data of the representative CPU belonging to the same group acquired during the blank period, on the display apparatus 4.

Other than a display request for displaying the performance data of CPUs on the display apparatus 4, when receiving a request for the performance data of CPUs other than a representative CPU, the performance data reproduction unit 2c reproduces the performance data of the CPUs for a blank period in the same way.

The following describes how a performance data management system configured as above operates.

In the performance data collection apparatus 1, the performance data collection unit 1b collects the performance data of each of the managed CPUs, measured by the performance measurement unit 3, when the performance data collection interval expires. The grouping unit 1c compares the performance data collected by the performance data collection unit 1b with each other to detect CPUs whose performance data falls within a predetermined range of approximation, and forms a group of the CPUs. Then, the grouping unit 1c selects a representative CPU from among the CPUs of the group. In the case where there are already existing groups, the grouping unit 1c compares the performance data of the representative CPU of a group with that of the representative CPU of another group, and if both of the performance data fall within the range of approximation, the grouping unit 1c combines these groups. The grouping unit 1c also calculates a similarity level based on how long the group continues to be in a similarity state, that is, how long the performance data continues to fall in the range of approximation. In addition, the grouping unit 1c checks the performance data of the CPUs of the group at evaluation intervals to confirm if there is any CPU whose performance data is out of the range of approximation. Then, the grouping unit 1c separates a CPU whose performance data is out of the range of approximation, from the group.

The performance data transmission unit 1d transmits, with reference to the grouping information, the performance data of the representative CPU of a group to the performance data management apparatus 2 at specified transmission intervals. On the other hand, the performance data transmission unit 1d transmits the performance data of the other CPUs to the performance data management apparatus 2 at transmission intervals that are longer than the specified transmission intervals. The transmission intervals are changed according to the similarity level.

In the performance data management apparatus 2, the performance data receiving unit 2b stores and manages the performance data received from the performance data collection apparatus 1 in the performance data database 2a. Then, when the performance data of CPUs other than a representative CPU for a blank period during which the performance data was not acquired is requested, for example, in a display request for displaying the performance data on the display apparatus 4, the performance data of these CPUs for the blank period is reproduced by using the performance data of the representative CPU acquired during the blank period.

As described above, a group of CPUs having similar characteristics is formed, and a transmission frequency of transmitting the performance data of the CPUs other than a representative CPU is reduced, which reduces the amount of performance data to be transmitted from the performance data transmission unit 1d. This leads to a reduction in the amount of performance data that occupies a network bandwidth, thereby reducing the communication load. In addition, this eventually leads to a reduction in the amount of performance data to be stored in the performance data database 2a by the performance data management apparatus 2, thereby suppressing an increase in a disk capacity. As described above, it becomes possible to suppress adverse effects of an increase in the amount of performance data on the system in the performance data management process, and to keep a preferable operating status of the system.

In the above embodiment, the performance data collection apparatus 1 collects performance data from a computer having multithreaded architecture. Alternatively, a computer having single-threaded architecture may be used. In the single-threaded architecture, one thread corresponds to a single CPU core, so performance data acquired may be treated as the performance data of the CPU core.

The following describes a second embodiment where a plurality of nodes is provided in a performance data management system.

Figure 2:
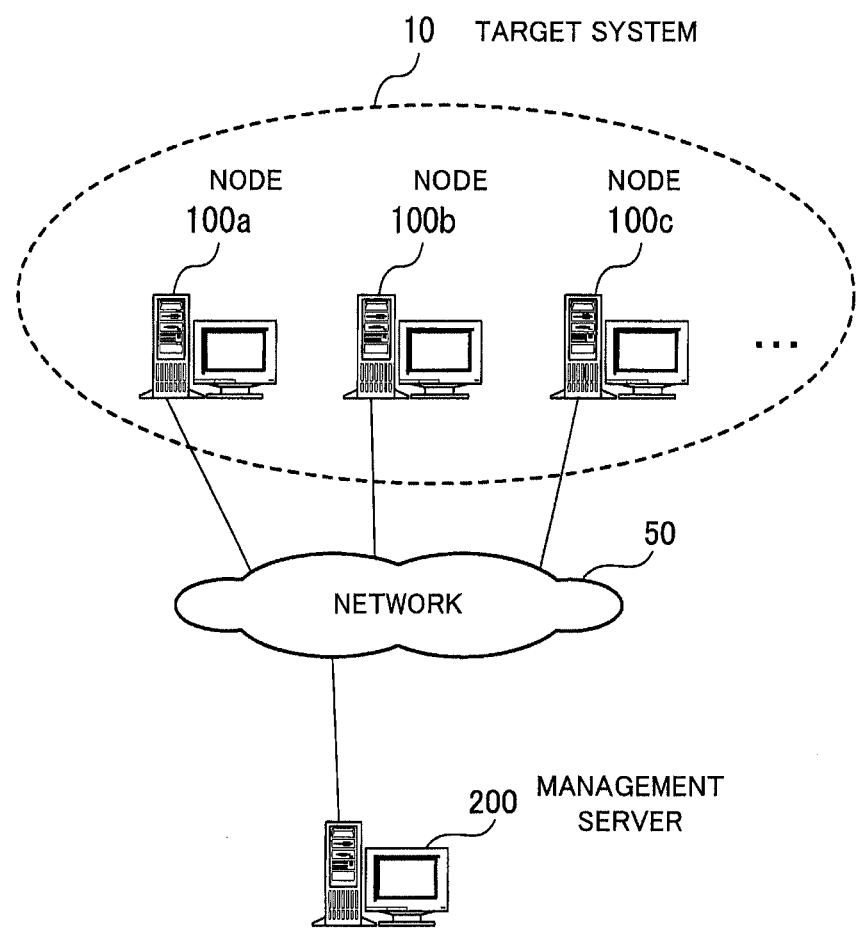
FIG. 2 illustrates an example configuration of a performance data management system according to a second embodiment.

FIG. 2 illustrates an example configuration of a performance data management system according to a second embodiment. A target system 10 includes a plurality of nodes 100a, 100b, 100c, .... Each node 100a, 100b, 100c, ... is provided with a plurality of CPUs to perform parallel processing of applications, and is connected to a management server 200 over a network 50. The management server 200 collects performance data from the plurality of nodes 100a, 100b, 100c, ..., and accumulates and manages the performance data in a database.

Figure 3:
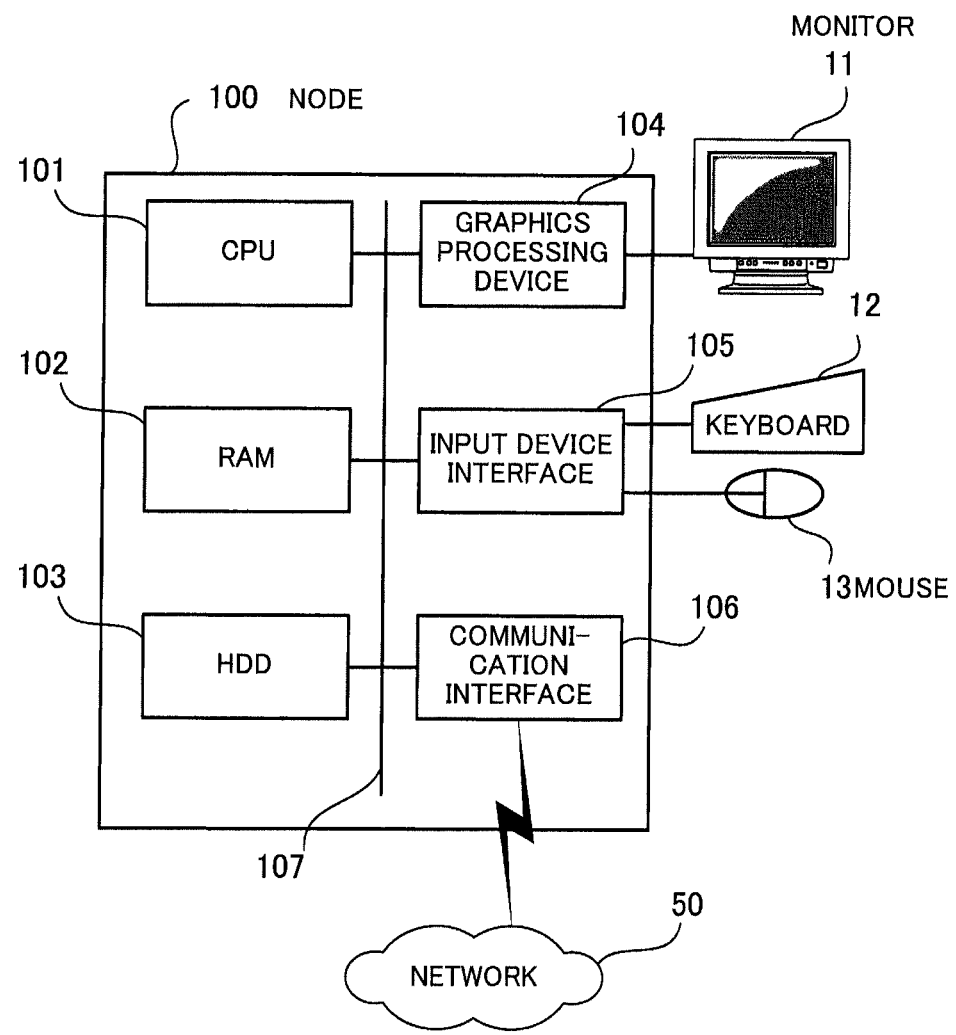
FIG. 3 is a block diagram illustrating an example hardware configuration of a node.

The following describes a hardware configuration of a node 100. FIG. 3 is a block diagram illustrating an example hardware configuration of a node.

The node 100 is entirely controlled by a CPU 101. Connected to the CPU 101 via a bus 107 are a Random Access Memory (RAM) 102, a Hard Disk Drive (HDD) 103, a graphics processing device 104, an input device interface 105, and a communication interface 106. In addition, the CPU 101 has a plurality of CPU cores to function as a multi-processor that is capable of performing parallel processing.

The RAM 102 temporarily stores part of OS and application programs to be executed by the CPU 101. The RAM 102 also stores various data to be used while the CPU 101 runs. The HDD 103 stores the OS and application programs. The graphics processing device 104 has a monitor 11 connected thereto, and displays an image on a screen of the monitor 11 under the control of the CPU 101. The input device interface 105 has a keyboard 12 and mouse 13 connected thereto, and transfers signals from the keyboard and mouse 13 to the CPU 101 via the bus 107. The communication interface 106 is connected to the network 50, and communicates data with the management server 200 over the network 50.

With such a hardware configuration, the processing functions of a node are realized. Although FIG. 3 illustrates the hardware configuration of a node, the management server 200 may have the same hardware configuration. In this connection, the management server 200 may not be provided with the monitor 11, keyboard 12, or mouse 13.

Figure 4:
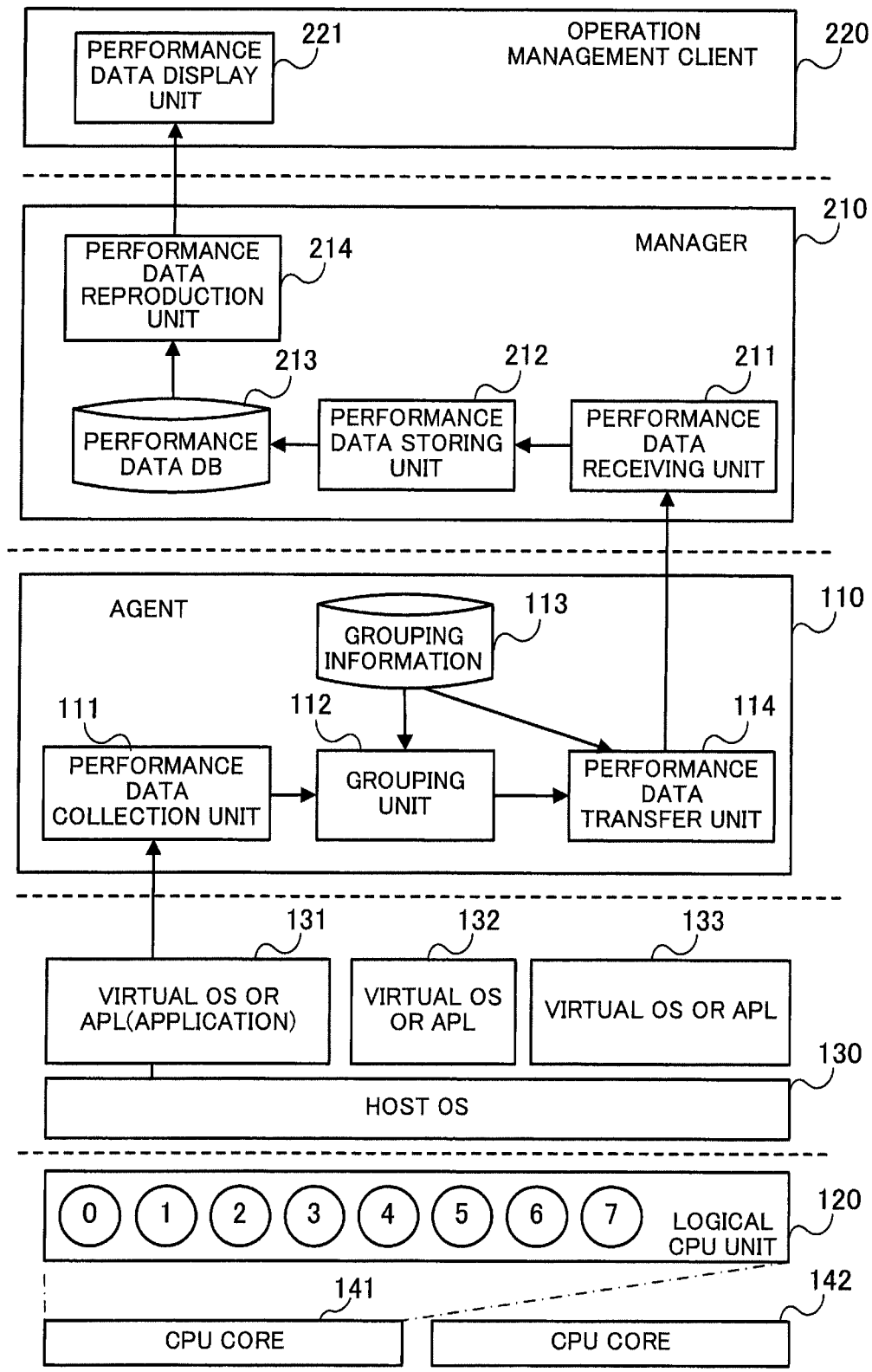
FIG. 4 is a block diagram illustrating functions for collecting and managing performance data.

FIG. 4 is a block diagram illustrating functions for collecting and managing performance data. FIG. 4 illustrates functions of the nodes 100a, 100b, 100c, ..., management server 200, and operation management client 220. Each node 100a, 100b, 100c, ... has a multicore CPU with CPU cores 141 and 142, and a plurality of threads, each as a unit of execution, is assigned to one core.

Each node 100a, 100b, 100c, ... is provided with processing functions including a logical CPU unit 120, a host OS 130, virtual OSes or applications (APL) 131, 132, and 133, and an agent 110.

The logical CPU unit 120 includes as many logical CPUs as the number of threads corresponding to a CPU core. Referring to FIG. 4, eight threads at maximum are allowed to be assigned to one CPU core 141. This applies to the CPU core 142. In the following description, CPU0 to CPU7 refer to logical CPUs corresponding to respective threads. At least one thread is assigned to one application, and the CPU0 to CPU7 of the logical CPU unit 120 perform processes instructed via the host OS 130, in parallel.

The host OS 130 manages the plurality of logical CPUs of the logical CPU unit 120, and measures a characteristic value when each CPU executes a process. The virtual OS or application 131, 132, and 133 uses the CPUs of the logical CPU unit 120 via the host OS 130. The characteristic values of the CPU0 to CPU7 are approximate to each other when the CPU0 to CPU7 execute the same application. For example, if three threads are assigned to the virtual OS or application 131, and correspond to the CPU0 to CPU2, respectively, the characteristic values of the CPU0 to CPU2 are approximate to each other.

The agent 110 includes a performance data collection unit 111, grouping unit 112, grouping information (storage unit) 113, and performance data transfer unit 114. The performance data collection unit 111 collects the measurement data of all CPUs of the logical CPU unit 120 measured by the host OS 130, from the host OS 130. Some OSes may be provided with functions of measuring the states of an apparatus, such as an execution state of a CPU, an access state of accessing to an I/O, or an execution state of a process. In the UNIX (registered trademark) system, for example, a "sar" command is used to collect information on performance of a CPU, such as CPU utilization or memory utilization. An "iostat" command is used to collect a disk load status. The grouping unit 112 forms groups of CPUs on the basis of the performance data of the CPUs collected by the performance data collection unit 111, and selects a representative CPU of each group. Then, the grouping unit 112 generates grouping information on the formed groups, and stores the grouping information in the grouping information (storage unit) 113. In addition, the grouping unit 112 evaluates the validity of each group at evaluation intervals, and re-forms the groups as needed. At this time, the similarity level is updated accordingly. The performance data transfer unit 114 transmits, with reference to the grouping information, the performance data of the representative CPU of each group to the manager 210 at specified transmission intervals. The performance data of the CPUs other than the representative CPU of each group is transmitted to the manager 210 at transmission intervals that are changed according to the similarity level of the group.

The management server 200 includes the manager 210 for accumulating and managing performance data.

The manager 210 includes a performance data receiving unit 211, performance data storing unit 212, performance data database 213, and performance data reproduction unit 214. The performance data receiving unit 211 receives performance data from the performance data transfer unit 114 of the agent 110, and supplies the performance data to the performance data storing unit 212. The performance data storing unit 212 stores the received performance data in the performance data database 213. The performance data reproduction unit 214 reproduces, in response to a display request for displaying performance data from a performance data display unit 221, the performance data of the CPUs other than the representative CPU for a requested blank period during which the performance data of the CPUs was not received from the agent 110, by using the performance data of the representative CPU received during the blank period. The reproduced performance data is transmitted to the performance data display unit 221.

The operation management client 220 takes in client instructions regarding performance data that the management server 200 accumulates and manages, and delivers the instructions to the management server 200. The performance data display unit 221 receives a display request instruction for displaying the performance data from a client, and notifies the manager 210 of the request. Then, the operation management client 220 displays the performance data received from the manager 210 on a display apparatus.

FIG. 5 illustrates an example of grouping information.

The grouping information 1130 includes information items including "CPU" 1131, "Group ID" 1132, "Similarity Level" 1133, and "Representative CPU" 1134, and values of these information items are set by the grouping unit 112 in the grouping process. The "CPU" 1131 indicates the identification information (hereinafter, referred to as ID) of the logical CPUs of the logical CPU unit 120. The other information items are set in association with a corresponding logical CPU. The "Group ID" 1132 indicates the ID of a group to which a corresponding CPU belongs. Every time a new group is formed, the grouping unit 112 sets a unique group ID for the group. The "Similarity Level" 1133 indicates the similarity level of a group with the "Group ID" 1132 to which the corresponding CPU belongs. Referring to FIG. 5, a higher value means a higher similarity level. The "Representative CPU" 1134 indicates whether the corresponding CPU is the representative CPU of the group or not. Referring to FIG. 5, "1" indicates that the CPU is a representative CPU, and "0" indicates that the CPU is a non-representative CPU.

The above grouping information 1130 is just an example. Alternatively, information on CPUs belonging to a formed group may be set in association with the group.

A performance data management process in a performance data management system configured as above will now be described. The following describes the case of managing CPU utilization as one example of performance data.

When the collection interval expires, the performance data collection unit 111 collects the CPU utilization of each CPU of the logical CPU unit 120, which is measured by the host OS 130, from the host OS 130.

Figure 6:
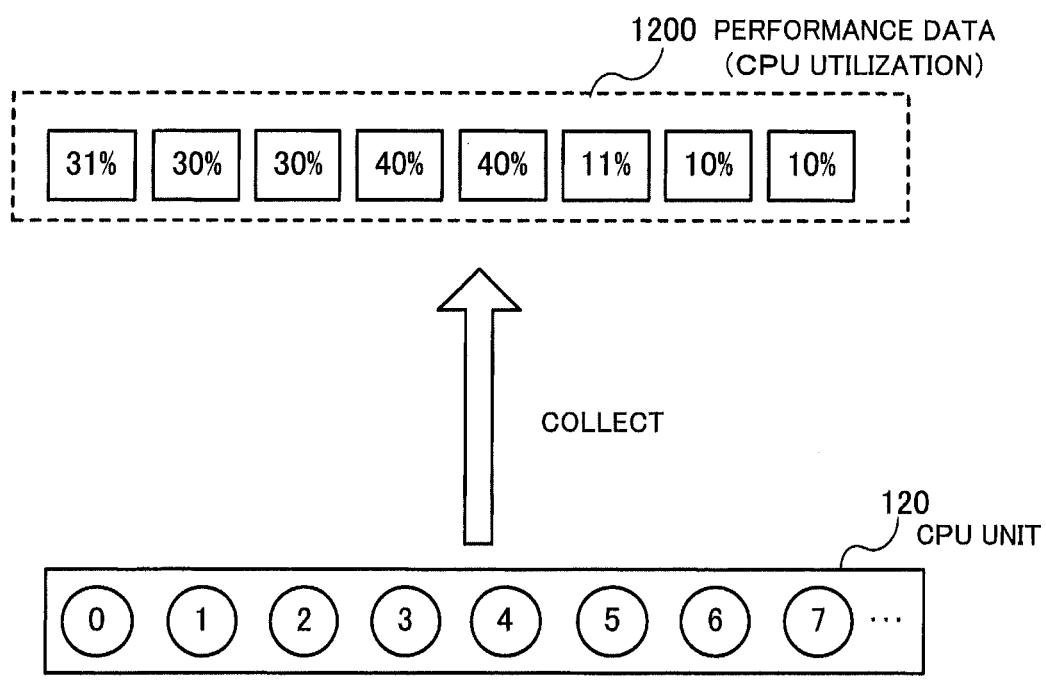
FIG. 6 illustrates an example of collected performance data (CPU utilization)

FIG. 6 illustrates an example of collected performance data (CPU utilization). Referring to the example of FIG. 6, the performance data (CPU utilization) 1200 of the CPU0 to CPU7 of the logical CPU unit 120 is acquired from the host OS 130. The CPU utilization of CPU0 is "31%". Similarly, the CPU utilizations of CPU1 to CPU7 are "30%", "30%", "40%", "40%", "11%", "10%", and "10%", respectively.

The grouping unit 112 groups the CPUs on the basis of the collected performance data (CPU utilization).

Figure 7:
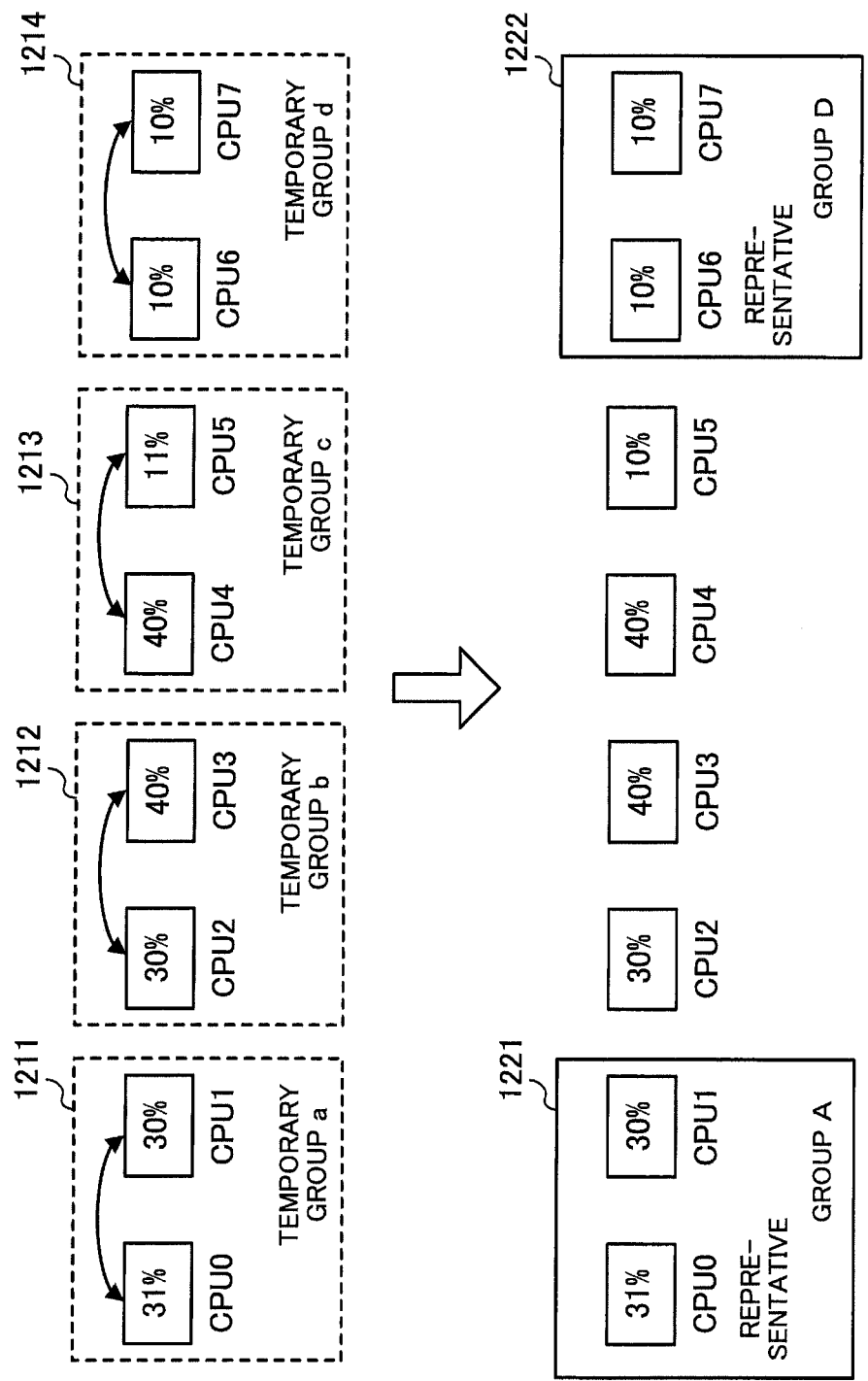
FIG. 7 illustrates the first round of a grouping process.

FIG. 7 illustrates the first round of a grouping process. The first round of the grouping process is performed after performance data is first collected when no groups exist.

To compare the CPU utilizations of CPUs with each other, temporary groups of two CPUs are formed. Referring to the example of FIG. 7, CPUs are grouped in order, thereby generating four temporary groups: a temporary group a 1211 including CPU0 and CPU1, a temporary group b 1212 including CPU2 and CPU3, a temporary group c 1213 including CPU4 and CPU5, and a temporary group d 1214 including CPU6 and CPU7. Then it is determined whether or not the CPU utilizations of the two CPUs of each temporary group fall within a predetermined range of approximation. In this example, a predetermined range of tolerance is set to ±α, and if a difference between two CPU utilizations falls within ±α, the CPU utilizations of these CPUs are determined to fall within the range of approximation. Then, when it is confirmed n times in a row that the CPU utilizations of the CPUs of a temporary group fall within the range of approximation, this temporary group is fixed as a valid group. In this connection, CPU utilization of "0" is excluded from the comparison process. The following describes the case where α is set to "1.0" and n is set to "1" as the example of FIG. 7.

A difference between 31% CPU utilization of CPU0 and 30% CPU utilization of CPU1 in the temporary group a 1211 falls within the range of tolerance of ±1.0%. In addition, since n is 1, this temporary group a 1211 is determined valid, and is fixed as a group A 1211. Then, a representative CPU is selected in this group. For example, a CPU having the highest characteristic value is selected in a group. Referring to the example of FIG. 7, CPU0 has 31% CPU utilization, and CPU1 has 30% CPU utilization, so that CPU0 is selected as a representative CPU. Alternatively, a representative CPU may be selected on the basis of identification numbers given to CPUs. In addition, the similarity level is set to an initial value of "1".

A difference between 30% CPU utilization of CPU2 and 40% CPU utilization of CPU3 in the temporary group b 1212 is out of the range of tolerance of ±1.0%. Therefore, this temporary group b 1212 is determined invalid.

A difference between 40% CPU utilization of CPU4 and 11% CPU utilization of CPU5 in the temporary group c 1213 is out of the range of tolerance of ±1.0%. Therefore, this temporary group c 1213 is determined invalid.

A difference between 10% CPU utilization of CPU6 and 10% CPU utilization of CPU7 in the temporary group d 1214 falls within the range of tolerance of ±1.0%. In addition, since n is 1, this temporary group d 1214 is determined valid, and is fixed as a group D 1222. Since the CPUs have the same CPU utilization, CPU6 having a smaller identification number is selected as a representative CPU. In addition, the similarity level is set to the initial value of "1".

As a result, the groups A 1221 and D 1222 are fixed. The grouping information on each of these groups is generated and stored in the grouping information (storage unit) 113.

Figure 8:
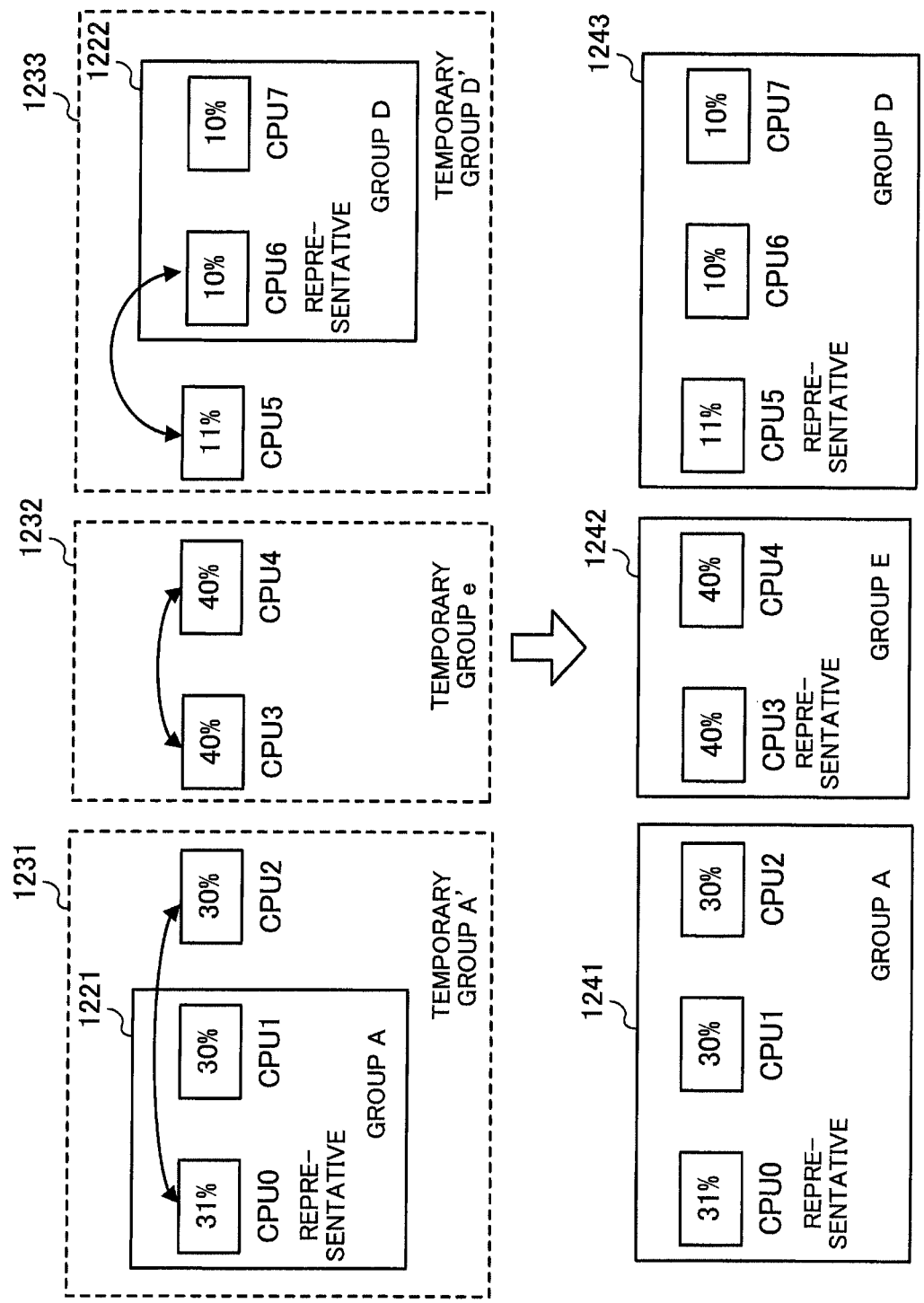
FIG. 8 illustrates the second round of the grouping process.

FIG. 8 illustrates the second round of the grouping process. The second round of the grouping process is executed when performance data is collected while the groups A 1221 and group D 1224 exist as illustrated in FIG. 7. In this example, suppose that the same CPU utilizations as indicated in the example of FIG. 7 are collected.

Temporary groups of two CPUs are formed in the same way. At this time, if there is a fixed group, the representative CPU of this group is grouped with another CPU. Referring to the example of FIG. 8, three temporary groups are formed: a temporary group A' 1231 including CPU0, which is the representative CPU of the group A 1221, and CPU2, a temporary group e 1232 including CPU3 and CPU4, and a temporary group D' 1233 including CPU5 and CPU6, which is the representative CPU of the group D 1222. Then, it is determined whether or not the CPU utilizations of the two CPUs of each temporary group fall within the predetermined range of approximation. Once a group is fixed, only the representative CPU of the group is used for comparison. Therefore, as the number of groups increases, the number of temporary groups decreases, and the number of comparisons decreases.

A difference between 31% CPU utilization of CPU0 and 30% CPU utilization of CPU2 in the temporary group A' 1231 falls within the range of tolerance of ±1.0%. In addition, since n is 1, this temporary group A' 1231 is determined valid. Therefore, a group formed by adding CPU2 to the group A 1221 is fixed as a group A 1241. CPU0 having the highest CPU utilization is selected as a representative CPU of this group.

A difference between 40% CPU utilization of CPU3 and 40% CPU utilization of CPU4 in the temporary group e 1232 falls within the range of tolerance of ±1.0%. In addition, since n is 1, this temporary group e 1232 is determined valid, and is fixed as a group E 1242. CPU3 is selected as a representative CPU of this group. In addition, the similarity level is set to the initial value of "1".

A difference between 11% CPU utilization of CPU5 and 10% CPU utilization of CPU6, which is the representative CPU of the group D 1222, in the temporary group D' 1233 falls within the range of tolerance of ±1.0%. In addition, since n is 1, this temporary group D' 1233 is determined valid. Therefore, the group formed by adding CPU5 to the group D 1222 is fixed as a group D 1243. CPU5 having the highest CPU utilization is selected as a representative CPU of this group.

As a result, the groups A 1241, E 1242, and D 1243 have been fixed. The grouping information on each of the groups is generated and stored in the grouping information (storage unit) 113. The grouping information 1130 illustrated in FIG. 5 represents the group state of this situation.

In the next round, the representative CPU of the group A 1241 and the representative CPU of the group E 1242 are compared with each other, but they are not grouped.

After a group is fixed, the performance data of CPUs in the group may become out of the range of approximation due to a change in system utilization. Therefore, group validity is evaluated at evaluation intervals to confirm whether or not the performance data of the member CPUs still falls within the range of approximation. If it is confirmed as a result of the validity evaluation that the performance data of all CPUs in a group falls within the range of approximation, the similarity level of this group is increased. This means that the similarity level increases according to how long the CPUs of a group continue to have similar characteristics (how long performance data continues to fall within the range of approximation). If a CPU whose performance data becomes out of the range of approximation, this CPU is separated from the group. If the performance data of all group members becomes out of the range of approximation to performance data of the representative CPU, this group is broken up. The following describes these processes.

Figure 9:
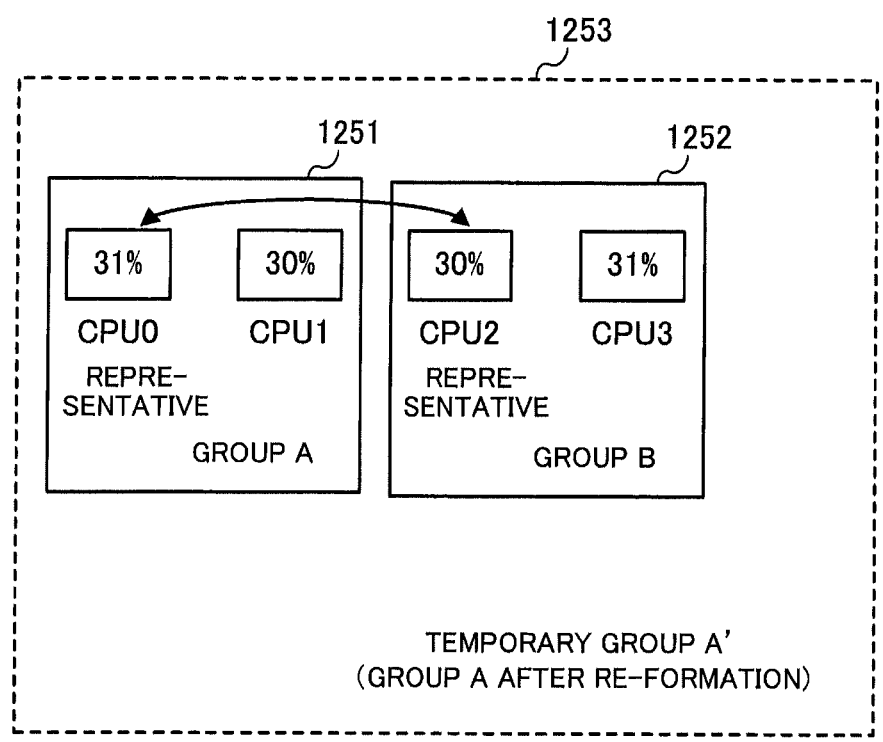
FIG. 9 illustrates a process of combining groups.

FIG. 9 illustrates a process of combining groups. In the grouping process, the CPU utilizations of the representative CPUs of groups are compared with each other, and if these CPU utilizations fall in a range of approximation, a process of combining these groups is performed. Referring to FIG. 9, there are groups: a group A 1251 including CPU0 that is a representative CPU and CPU1; and a group B 1252 including CPU2 that is a representative CPU and CPU3. Under this condition, the grouping process is performed after the performance data of these CPUs is collected.

The group A 1251 and group B 1252 are grouped as a temporary group A' 1253, and the CPU utilizations of the representative CPUs of these groups are compared with each other. Referring to FIG. 9, 31% CPU utilization of CPU0 of the group A 1251 and 30% CPU utilization of CPU2 of the group B 1252 are compared with each other. Assuming that the judgment conditions illustrated in FIG. 7 are employed in this example, it is determined that a difference in CPU utilization between these representative CPUs falls within the range of tolerance of ±1.0%. Since n is 1, this temporary group A' 1253 is determined valid. Then, the groups A 1251 and B 1252 are combined and fixed as a group A 1253. CPU0 having the highest CPU utilization is selected as a representative CPU of this group. The similarity level is set to the initial value. Then, grouping information on the group A 1253 is generated, and the grouping information in the grouping information (storage unit) 113 is updated with the generated grouping information.

Figure 10:
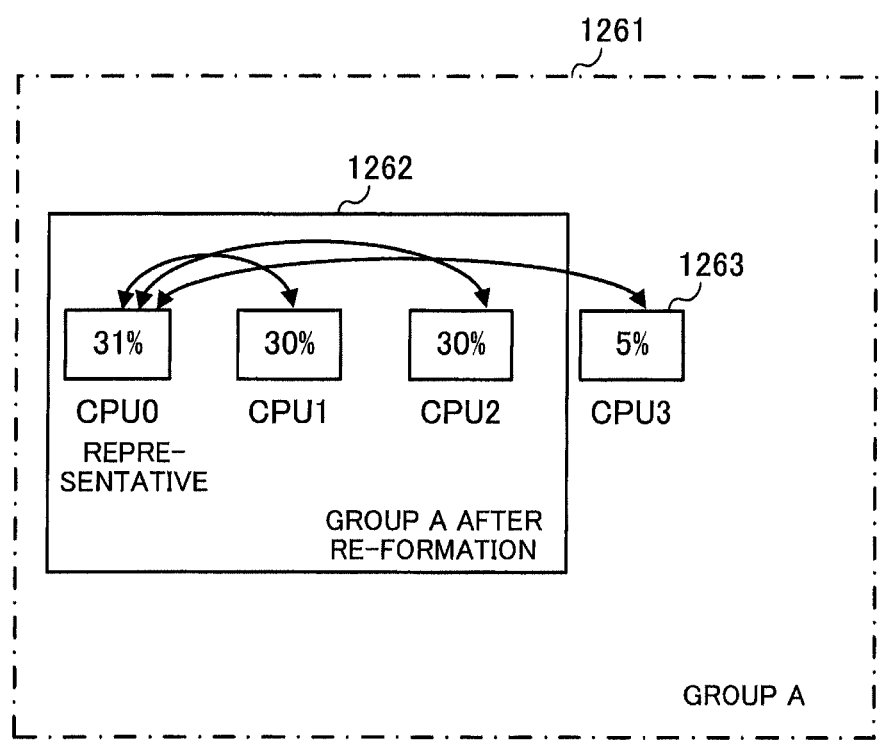
FIG. 10 illustrates a process of separating a member from a group.

FIG. 10 illustrates a process of separating a member from a group.

The evaluation process for checking validity of the members of a group is performed by comparing the CPU utilization of a representative CPU with the CPU utilizations of the other CPUs. FIG. 10 illustrates an example of evaluating the validity of a group A 1261 including four CPUs: CPU0 that is a representative CPU, CPU1, CPU2, and CPU3. The CPU utilization of CPU0 that is the representative CPU is sequentially compared with the CPU utilizations of CPU1, CPU2, and CPU3. A difference between 31% CPU utilization of CPU0 and 30% CPU utilization of each of CPU1 and CPU2 falls within the range of tolerance of ±0.1%. On the other hand, a difference between 31% CPU utilization of CPU0 and 5% CPU utilization of CPU3 is out of the range of tolerance of ±0.1%. Therefore, CPU3 is separated from the group A 1261. As a result, the group A 1261 is divided into the group A 1262 and a single CPU3 (1263). In addition, CPU0 is selected as a representative CPU of this new group A 1262. Then, the grouping information on the group A 1262 is generated, and the grouping information in the grouping information (storage unit) 113 is updated with the generated grouping information.

Figure 11:
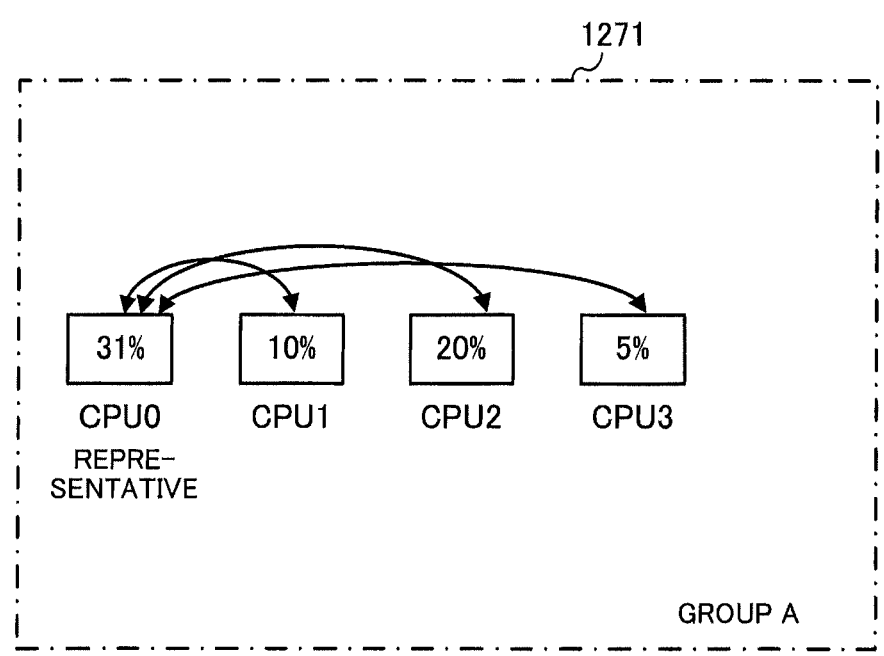
FIG. 11 illustrates a process of breaking up a group.

FIG. 11 illustrates a process of breaking up a group.

As in the example of FIG. 10, a group A 1271 including four CPUs: CPU0 that is a representative CPU, CPU1, CPU2, and CPU3 is evaluated. 31% CPU utilization of CPU0 as the representative CPU is sequentially compared with the CPU utilizations of CPU1 to CPU3. Referring to the example of FIG. 11, the CPU utilizations of CPU1, CPU2, and CPU3 are "10%", "20%", and "5%", respectively, and therefore a difference in CPU utilization between CPU0 and each of CPU1, CPU2, and CPU3 is out of the range of tolerance of ±0.1%. Therefore, the group A 1271 is broken up so as to treat CPU0 to CPU3 as independent CPUs. Then, the information on the group A 1271 is deleted from the grouping information (storage unit) 113.

As described above, the agent 110 collects the performance data of CPUs, and on the basis of the collected performance data, forms or breaks up groups of CPUs having similar characteristics or changes members. Since the members in groups are changed depending on the performance data as described above, it becomes possible to reflect the actual state on groups.

The evaluation intervals for evaluating the validity of the members in groups may not be fixed and may be changed according to similarity level.

Figure 12:
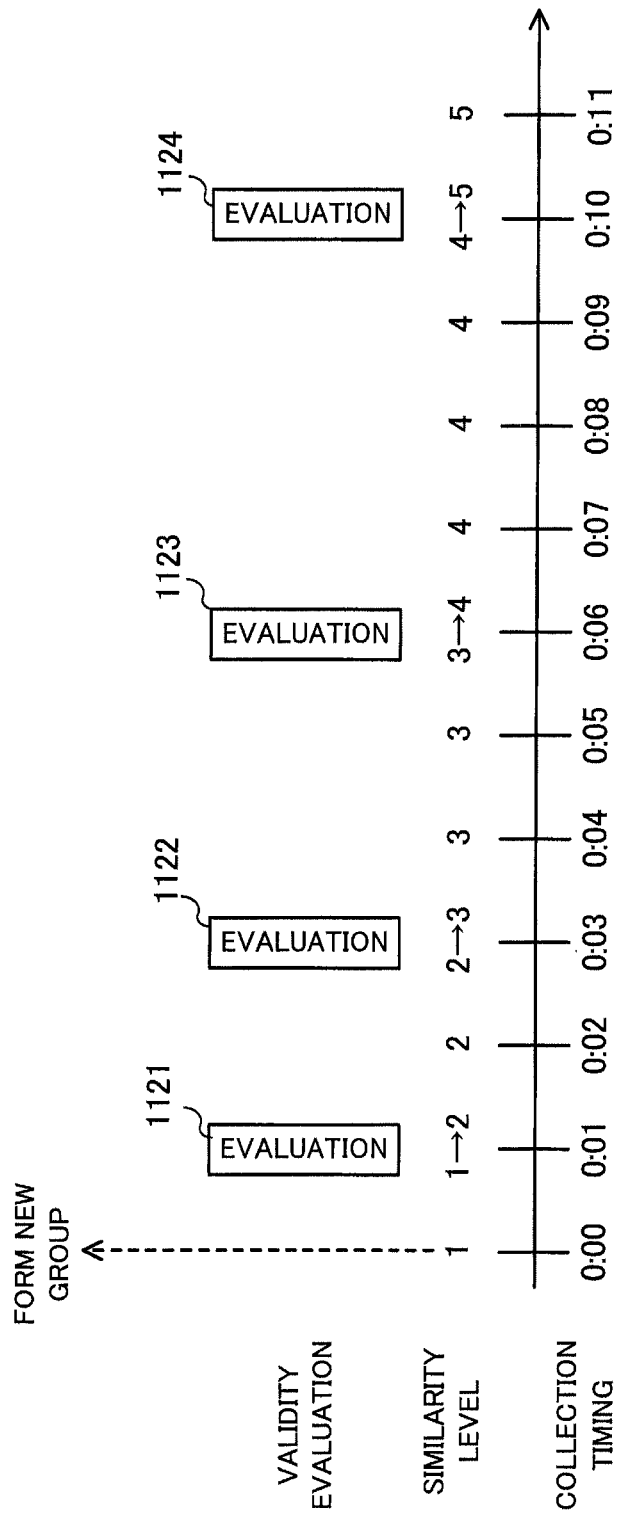
FIG. 12 illustrates evaluation intervals according to similarity level.

FIG. 12 illustrates evaluation intervals according to similarity level. The evaluation intervals for evaluating the validity of group members are changed based on the collection intervals for collecting the performance data of CPUs. Referring to FIG. 12, the collection intervals of one minute are set, and the performance data is collected every one minute from "0:00".

In this example, in a grouping process performed after the performance data is collected at a collection time of "0:00", a group is newly formed, and its similarity level is set to an initial value. After the grouping process performed after the performance data is collected at the next collection time of "0:01", the validity of the formed group is evaluated. Now that the similarity level is "1" and the first collection interval has expired, an evaluation process 1121 is performed. If it is determined through this evaluation process 1121 that the performance data of the CPUs of this group falls within a range of approximation, the similarity level is incremented by one to "2". Now that the similarity level is "2", an evaluation process 1122 is performed at a collection time of "0:03" which is two collection intervals away from the previous evaluation time of "0:01". If it is determined through this evaluation process 1122 that the performance data of the CPUs of this group falls within the range of approximation, the similarity level is incremented by one to "3". Then, an evaluation process 1123 is performed at a collection time of "0:06" which is three collection intervals away from the previous evaluation time of "0:03". If it is determined through this evaluation process 1123 that the group is valid, the similarity level is incremented by one to "4". Similarly, an evaluation process 1124 is performed at a collection time of "0:10" which is four collection intervals away from the previous evaluation time of "0:06". If it is determined through this evaluation process 1124 that the performance data of the CPUs of this group falls within the range of approximation, the similarity level is incremented by one to "5". In this way, as the CPUs of the group continue to have similar characteristics, the similarity level increases. Then, the evaluation intervals for evaluating the validity of the group are made longer according to the similarity level. That is to say, with respect to a group of CPUs having a high degree of similarity, that is, a group of CPUs whose performance data is more likely to be approximate to each other, the evaluation intervals are made longer, thereby reducing the load of the evaluation on the agent 110.

Through the above processes, groups of managed CPUs having similar characteristics, that is, having approximate performance data are formed. With respect to each group, a representative CPU is selected, and the similarity level is set according to how long the CPUs of the group continue to have similar characteristics. Information on the groups is stored in the grouping information (storage unit) 113. The performance data transfer unit 114 transmits the performance data of CPUs collected by the performance data collection unit 111 to the manager 210 with reference to the grouping information.

The performance data transfer unit 114 transmits the performance data of the representative CPU of a group to the manager 210 at specified intervals, and transmits the performance data of the CPUs other than the representative CPU at transmission intervals (referred to as longer intervals) that are longer than the specified intervals.

FIGS. 13A and 13B illustrate an example of data items of transmit data to be transmitted to a manager. FIG. 13A illustrates data items of transmit data to be transmitted at specified intervals, and FIG. 13B illustrates data items of transmit data to be transmitted at longer intervals.

Referring to FIG. 13A, transmit data 1140 to be transmitted at specified intervals has data items including "Time" indicating when performance data was collected, "CPU-ID" identifying a representative CPU, and collected performance data ("CPU Utilization"). In the transmit data 1140 to be transmitted at the specified intervals, a "Representative CPU" data item has zero data or is not transmitted. Referring to the example of FIG. 13A, with reference to the grouping information 1130 illustrated in FIG. 5, the CPU utilizations of CPU0, CPU3, and CPU5, which are representative CPUs, collected at time of "0:00" are transmitted to the manager 210 as the transmit data 1140.

Referring to FIG. 13B, transmit data 1141 to be transmitted at longer intervals has data items including "Representative CPU" indicating the ID of the representative CPU of a group, in addition to "Time" indicating when performance data was collected, "CPU-ID" identifying a CPU, and performance data ("CPU Utilization"). Referring to the example of FIG. 133, as the transmit data 1141, the CPU utilizations of CPU0 which is the representative CPU of a group with ID=1, CPU1, CPU2, and CPU3, collected at time of "0:05", are transmitted to the manager 210. Similarly, the CPU utilizations of CPU3 which is the representative CPU of a group with ID=2, and CPU4, collected at time of "0:05", are transmitted to the manager 210. Further, by using a "Representative CPU" field, the ID of the representative CPU (CPU0) corresponding to the CPU1 and CPU2 are transmitted in association with CPU1 and CPU2 that are non-representative CPU. Similarly, in association with CPU4, the ID of the representative CPU (CPU3) corresponding to CPU4 is transmitted.

Figure 14:
FIG. 14 illustrates an example of the performance data of CPUs to be transmitted to the manager.

FIG. 14 illustrates an example of the performance data of CPUs to be transmitted to a manager. The group with group ID of "1" includes CPU0 that is a representative CPU, and CPU1 and CPU2 that are non-representative CPU.

The performance data of the representative CPU (CPU0) is transmitted to the manager 210 at collection intervals. Therefore, as the transmit data 1142 of the representative CPU (CPU0), the performance data collected is all transmitted at the collection intervals (every one minute).

On the other hand, the performance data of non-representative CPUs (CPU1 and CPU2) is taken in the agent 110 by the performance data collection unit 111 at the collection intervals. However, the performance data is transmitted to the manager 210 at longer intervals that are determined according to similarity level. In this example, it is assumed that the similarity level is "5", and five minutes calculated by multiplying the collection intervals (one minute) by the similarity level (=5) are set as transmission intervals for transmitting the performance data. Therefore, as the transmit data 1143 of a non-representative CPU (CPU1), the performance data is transmitted at the transmission intervals (every five minutes). Referring to the example of FIG. 14, the performance data is transmitted every five minutes, i.e., times "0:00", "0:05". Similarly, as the transmit data 1144 of another non-representative CPU (CPU2), the performance data is transmitted at the transmission intervals (every five minutes).

As described above, with respect to the CPUs other than a representative CPU, the transmission of performance data is reduced, which leads to a reduction in the amount of data to be transmitted to the manager 210.

In addition, with respect to the transmit data illustrated in FIGS. 13A, 13B, and 14, information on a representative CPU of a group is associated with the CPUs other than the representative CPU. Alternatively, such information may be associated with a representative CPU in transmit data.

FIGS. 15A and 15B illustrate another example of data items of transmit data to be transmitted to a manager. FIG.

15A illustrates data items of transmit data to be transmitted at specified intervals. FIG. 15B illustrates data items of transmit data to be transmitted at longer intervals.

Referring to FIG. 15A, transmit data 1145 to be transmitted at specified intervals has the same data items as the transmit data 1140 illustrated in FIG. 13, including "Time", "CPU-ID" identifying a representative CPU, and performance data ("CPU Utilization"). An "Other CPUs" data item indicates the CPUs other than a representative CPU belonging to the same group as this representative CPU. For example, a data record with "CPU-ID" of CPU0 indicates that this group includes CPU1 and CPU2 other than CPU0 that is a representative CPU.

Similarly, referring to FIG. 15B, with respect to transmit data 1146 to be transmitted at longer intervals, the CPUs other than a representative CPU are set as an "Other CPUs" data item in association with the representative CPU.

Even when the transmit data 1145, 1146 is used, transmission of the performance data of the CPUs other than the representative CPUs is reduced, thereby reducing the amount of data to be transmitted to the manager 210. This is the same as described earlier.

The process of the manager 210 will now be described. In the manager 210, the performance data receiving unit 211 receives transmit data 1140 or 1145 that is transmitted from the agent 110 at specified intervals and transmit data 1141 or 1146 that is transmitted from the agent 110 at longer intervals. The performance data storing unit 212 stores the received performance data in a performance data table in the performance data database 213.

FIG. 16 illustrates an example of a performance data table to be stored in a performance data database.

A performance data table 2131 is an example data table that is generated when the transmit data 1140 that is transmitted at specified intervals and the transmit data 1141 that is transmitted at longer intervals, exemplified in FIG. 13, are received. When receiving the transmit data 1140 and 1141, the performance data storing unit 212 sorts the received data according to CPU-ID, and adds the data below a corresponding line of the performance data table 2131.

The performance data table 2131 of FIG. 16 contains performance data collected during a time period from "0:00" to "0:07". For example, with respect to CPU0 as a representative CPU, eight pieces of performance data collected at collection intervals of one minute are contained. On the other hand, with respect to CPU1 that is a non-representative CPU, two pieces of performance data collected during this time period are contained. Similarly, with respect to CPU2 that is also a non-representative CPU, two pieces of performance data are contained. A transmission frequency of transmitting the performance data of the CPUs other than the representative CPU from the agent 110 is reduced, thereby reducing the amount of data to be stored in the performance data database 213. In this connection, as compared with the performance data of the representative CPU, there is no performance data of the non-representative CPU1 and CPU2 for a time period from "0:01" to "0:04" and a time period from "0:06" to "0:07". Hereinafter, such a time period during which there is no performance data is referred to as a blank period indicating no-transmission of performance data.

By the way, one of the functions of the manager 210 is to provide requested performance data in response to a request for the performance data stored in the performance data database 213 from the operation management client 220 or another device. For example, the performance data display unit 221 of the operation management client 220 may make a request for displaying performance data by specifying a target CPU and a target time period. The manager 210, having received the request, extracts the requested performance data from the performance data database 213, and provides the performance data to the performance data display unit 221. However, there is a blank period in which there is no performance data of the CPUs other than the representative CPU of a group. The performance data reproduction unit 214 reproduces the performance data for this blank period by using the performance data of the representative CPU if the specified target time period includes the blank period of the requested target CPU.

FIG. 17 illustrates performance data (CPU utilization) to be displayed by an operation management client. FIG. 17 illustrates a state where an operation management client displays the performance data of CPU0 and CPU1 acquired from the manager 210 in a tabular form. It is assumed that target CPUs requested for display are CPU0 and CPU1, and a target time period is a time period from "0:00" to "0:07".

The performance data reproduction unit 214 extracts the performance data table 2131 from the performance data database 213, and transmits the performance data of CPU0 (representative CPU) which does not have a blank period to the performance data display unit 221 as it is. On the other hand, with respect to the performance data of CPU1 (non-representative CPU) which has a blank period, the performance data reproduction unit 214 transmits the performance data stored in the performance data table 2131 as it is. The performance data reproduction unit 214 also reproduces the performance data for the blank period by using the performance data of the representative CPU indicated in the "Representative CPU" field of the performance data table 2131. In this example, the performance data of CPU0 (representative CPU) acquired during the blank period is transmitted as the performance data of CPU1. Thereby, the performance data of CPU1 during the target time period is all displayed in the CPU utilization 2220 on the display screen of the operation management client 220. The performance data 2221 at time "0:00" and the performance data 2222 at time "0:05" acquired by the manager 210 are actually collected performance data. The performance data 2223 for a time period from "0:01" to "0:04" and the performance data 2224 for a time period from "0:06" to "0:07" are reproduced by using the performance data of CPU0 of the respective periods, and are displayed. In this way, the performance data for a blank period caused by reducing the transmission from the agent 110 is reproduced based on the performance data of a representative CPU whose characteristic data falls within a range of approximation, which makes it possible to provide reliable analysis.

FIG. 18 illustrates another example of a performance data table to be stored in a performance data database. FIG. 18 illustrates a performance data table to be stored in the performance data database 213 when the manager 210 receives the transmit data exemplified in FIG. 15.

A performance data table 2132 has the same structure as the performance data table 2131 except that the "Representative CPU" field of the performance data table 2131 illustrated in FIG. 16 is replaced with an "Other CPUs" field. The performance data storing unit 212 receives the transmit data 1145 and 1146, sorts the received data according to CPU-ID, and adds the data below a corresponding line of the performance data table 2132.

When reproducing the performance data of a CPU that a non-representative CPU, the performance data reproduction unit 214 searches the "Other CPUs" field of the performance data table 2132, and detects a representative CPU corresponding to the "Other CPUs" field where the target CPU is set. Then, the performance data reproduction unit 214 reproduces the performance data of the target CPU for a blank period by using the performance data of the detected representative CPU. A different procedure is performed for detecting a representative CPU corresponding to the target CPU, but the identical performance data is transmitted to the operation management client 220.

As described above, in the disclosed performance data management system, with respect to the nodes 100*a*, 100*b*, 100*c*, . . . , groups of CPUs whose performance data is approximate to each other are formed, the performance data of representative CPUs is transmitted at transmission intervals needed for performance analysis, and the performance data of the other CPUs is transmitted at longer transmission intervals. By reducing the transmission frequency for the CPUs other than the representative CPUs, it becomes possible to reduce the amount of performance data to be transmitted to the management server 200. In addition, the reduction in the amount of data received by the management server 200 leads to a reduction in the amount of performance data accumulated in the management server 200. This makes it possible to suppress adverse effects of the performance data collection process on the system. For example, in a system in which performance data is collected from target nodes as much as possible during a collection period between sampling intervals, a massive amount of performance data exists, and the number of nodes from which performance data can be collected decreases, which raises the possibility of unreliable performance analysis. As another example, by averaging the performance data of each CPU, in all nodes or in intervals longer than collection intervals, the amount of performance data to be transmitted may be reduced. However, this approach makes it difficult to confirm the tendency of characteristics of individual CPUs, and also leads to unreliable performance analysis. By contrast, in the disclosed performance data management system, an amount of performance data of representative CPUs is small, and the performance data is transmitted without fail. In addition, the performance data of the CPUs other than the representative CPUs is reproduced by using the performance data of the representative CPUs. Thus, it is possible to perform reliable performance analysis even if the transmission frequency is reduced to reduce the amount of data of the other CPUs.

Furthermore, for accumulating the performance data of managed CPUs in a local storage device, the disclosed performance data collection method may be employed. For example, CPUs are grouped according to a degree of similarity of performance data, a frequency of storing the performance data of the CPUs other than representative CPUs is reduced, thereby reducing the amount of performance data to be stored in the local storage device.

Figure 19:
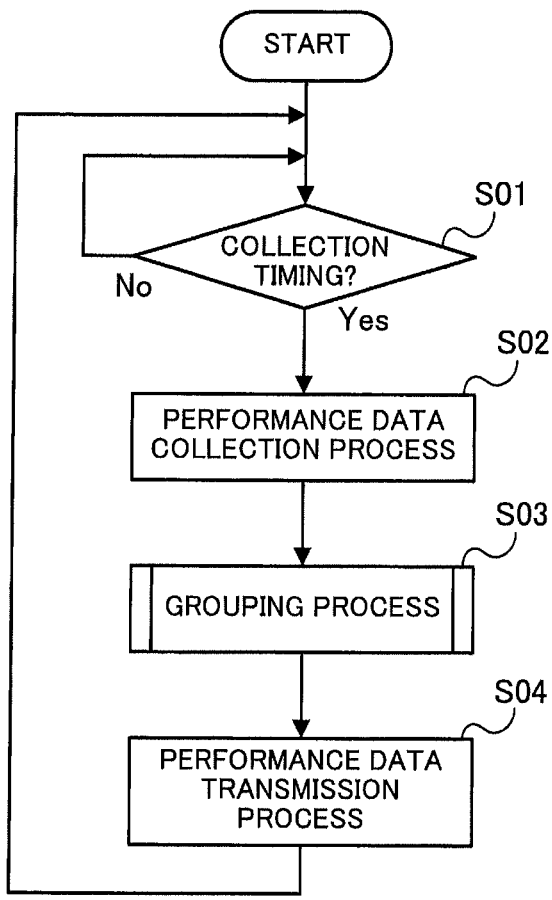
FIG. 19 is a flowchart illustrating a procedure of an agent.

The following describes what processes are performed in a performance data management system with reference to flowcharts. FIG. 19 is a flowchart illustrating a procedure of an agent.

At step S01, the agent 110 determines whether the collection interval for collecting performance data has expired or not. If it is determined that the collection interval has expired, the process proceeds to step S02. Otherwise, the agent 110 keeps in a waiting state.

At step S02, since the collection interval for collecting performance data has expired, the performance data collection unit 111 collects the performance data of all logical CPUs of the managed logical CPU unit 120 from the host OS 130.

At step S03, the grouping unit 112 analyzes the performance data of the CPUs collected at step S02, forms groups of CPUs having similar characteristics, and selects a representative CPU of each group. In addition, the grouping unit 112 evaluates the validity of the formed groups, and calculates a similarity level representing a degree of similarity of the characteristics of the CPUs. Information on each group and the similarity level thereof are stored as grouping information in the grouping information (storage unit) 113. This grouping process will be described in detail later.

At step S04, the performance data transfer unit 114 performs a process of transmitting performance data to the manager 210 with reference to the grouping information on the groups formed at step S03. For example, the collection interval for collecting the performance data is set as the specified interval for transmitting the performance data to the manager 210, and the performance data of the representative CPU of each group is transmitted at the specified intervals. On the other hand, the performance data of the CPUs other than the representative CPU of the group is transmitted to the manager 210 at transmission intervals that are longer than the specified intervals. The transmission intervals are changed according to similarity level. For example, with the specified interval as a basis, a value calculated by multiplying the specified interval by the similarity level is set as the transmission interval. In this connection, transmit data to be transmitted to the manger 210 may be prepared by the groping unit 112 in the course of the grouping process. In this case, the performance data transfer unit 114 controls the transmission process of transmitting generated transmit data to the manager 210.

With the above procedure, the agent 110 forms groups of CPUs having similar characteristics, and transmits, to the manager 210, the performance data of the representative CPU of each group at the specified intervals and the performance data of the CPUs other than the representative CPU at transmission frequency that is reduced according to the similarity level. This makes it possible to reduce the amount of performance data to be transmitted to the manager 210 and the amount of performance data to be managed by the manager 210.

Figure 20:
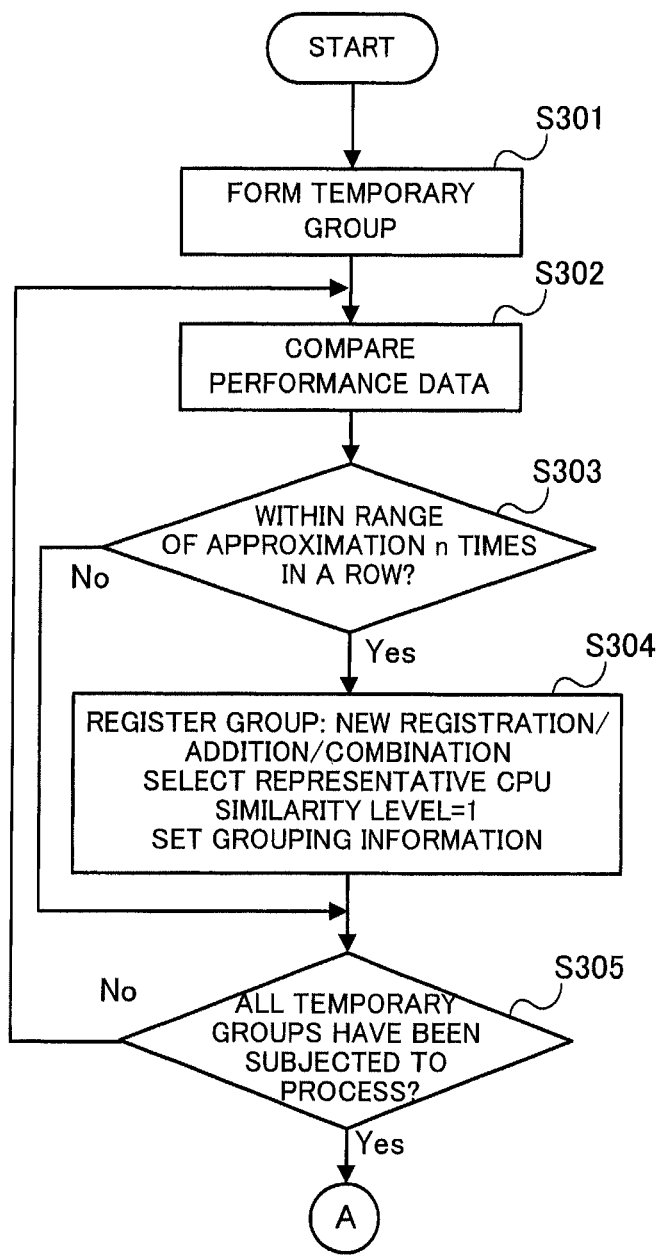
FIG. 20 is a flowchart illustrating a procedure for forming groups in a grouping process.

FIG. 20 is a flowchart illustrating a procedure for forming groups in a grouping process. The procedure of the grouping process advances to the flowchart of FIG. 21 via A. The grouping unit 112 starts after the performance data collection unit 111 collects the performance data of each CPU, and executes the following process.

At step S301, temporary groups are formed for comparison of performance data. A temporary group is formed by selecting two CPUs. When there are already groups existing, the representative CPU of one group is taken as a first CPU, a CPU that is the representative CPU of another group or does not belong to any groups is taken as a second CPU, and a temporary group of the first and second CPUs is formed. If a condition where performance data falls within a range of approximation needs to be satisfied n times in a row, the group formed in the course of the comparison is maintained in the subsequent comparison of performance data. After groups are formed in this way, only representative CPUs are considered for forming temporary groups, and the CPUs other than the representative CPUs are not considered, thereby reducing the load of the subsequent grouping process.

At step S302, the performance data of the CPUs of a temporary group formed at step S301 is compared with each other.

At step S303, it is determined whether or not the performance data of the two CPUs of the temporary group compared with each other at step S302 falls within the range of approximation n times in a row. n is a predetermined value, and the range of approximation is previously set. If the performance data falls within the range of approximation n times in a row, the process goes on to step S304. Otherwise, the process goes on to step S305.

At step S304, since the performance data of the two CPUs of the temporary group falls within the range of approximation n times in a row, this temporary group is registered as a group. If the CPUs of the temporary group do not belong to any groups, this temporary group is set as a new group. If one CPU is the representative CPU of a group and the other CPU does not belong to any groups, the CPU which does not belong to any groups is added to the group to which the representative CPU belongs. Both of the CPUs are the representative CPUs of groups, these groups are combined to form one group. Then, either CPU is selected as the representative CPU of this group. For example, a CPU having a higher value of the performance data is selected as a representative CPU. In addition, the similarity level is set to the initial value of "1". Then, grouping information on the member CPUs is generated and is stored in the grouping information (storage unit) 113. In the grouping information, the ID of the group, the similarity level, and the representative CPU of the group are registered in association with the ID of each CPU.

At step S305, it is determined whether all temporary groups formed at step S301 have been subjected to the process or not. If all of the temporary groups have been subjected to the process, the process proceeds to A of FIG. 21. Otherwise, the process returns back to step S302 to process a temporary group which has not been subjected to the process.

Figure 21:
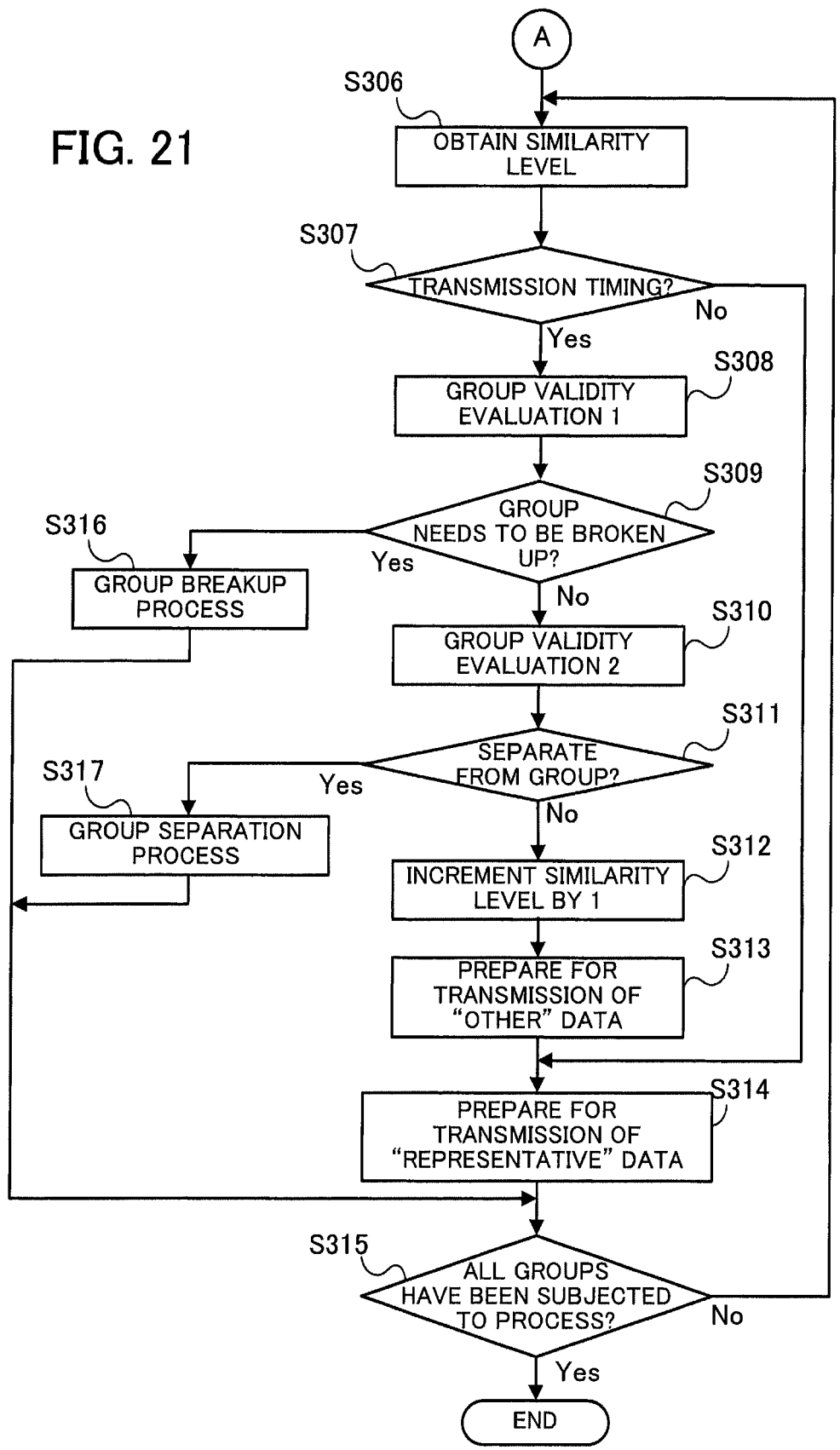
FIG. 21 is a flowchart illustrating a procedure for evaluating group validity in the grouping process.

FIG. 21 is a flowchart illustrating a procedure for evaluating group validity in the grouping process. The grouping unit 112 performs this process following the grouping process illustrated in FIG. 20.

At step S306, the grouping unit 112 extracts the similarity level of an existing group from the grouping information.

At step S307, on the basis of the similarity level extracted at step S306, it is determined whether or not it is transmission timing of transmitting the performance data of the CPUs other than a representative CPU to the manager 210. In this process, with the collection interval for collecting performance data as a basis, timing obtained by repeating this collection interval as many times as the value of the similarity level of the group is taken as transmission timing. Therefore, the transmission interval is represented by multiplying the collection interval by the similarity level. In addition, it is assumed that evaluation of group validity is performed at the same timing as the transmission timing. If it is the transmission timing, the process goes on to step S308. Otherwise, the process goes on to step S314.

At step S308, since it is determined the transmission timing has come, a group validity evaluation 1 that is performed at the same timing as the transmission timing is performed. The group validity evaluation 1 is performed to sequentially evaluate, with the performance data of the representative CPU of the group as a reference, whether or not the performance data of the other CPUs in the group falls within a range of tolerance around the performance data of the representative CPU. Here, the range of tolerance is taken as equivalent to the range of approximation.

At step S309, the group validity evaluation 1 determines whether conditions for breaking up a group are satisfied or not. The group breakup conditions are that the performance data of the other CPUs in a group is out of the range of tolerance around the performance data of the representative CPU. If the group breakup conditions are not satisfied, the process goes on to step S310. Otherwise, the process goes on to step S316.

At step S310, since the group breakup conditions are not satisfied, a group validity evaluation 2 is performed. The group validity evaluation 2 evaluates, with the performance data of the representative CPU of the group as a reference, whether or not the performance data of any of the other CPUs in the group is out of the range of tolerance around the performance data of the representative CPU. In this connection, an evaluation result obtained at step S308 may be used where appropriate.

At step S311, the group validity evaluation 2 determines whether the group separation conditions are satisfied or not. The group separation conditions are that the performance data of a CPU that is not the representative CPU of the group is out of the range of tolerance around the performance data of the representative CPU of the group. If no CPUs satisfy the group separation conditions, the process goes on to step S312. If there is such a CPU that satisfies the group separation conditions, the process goes on to step S317.

At step S312, since the group breakup conditions are not satisfied, and no CPUs satisfy the group separation conditions, all CPUs of the group are determined to fall within the range of approximation. Then, the similarity level is incremented by one, thereby increasing the value of the similarity level.

At step S313, a preparation for transmitting the performance data of the CPUs other than the representative CPU of the group to the manager 210 is made. For example, the performance data of these CPUs stored in a temporal storage unit is extracted and is stored in a transmission buffer.

At step S314, a preparation for transmitting the performance data of the representative CPU of the group is made. Similarity to step S313, the performance data of the representative CPU stored in the temporal storage unit is extracted and is stored in the transmission buffer.

At step S315, it is determined whether all groups have been subjected to the process or not. If all groups have not been subjected to the process, the process returns back to step S306. Otherwise, this grouping process is completed.

At step S316, since the group breakup conditions are satisfied, this group is broken up. The corresponding grouping information is deleted from the grouping information. The CPUs of the group become belonging to no groups. Then, the process goes on to step S315.

At step S317, since there is a CPU that satisfies the group separation conditions, this CPU is separated from the group to be made independent. The corresponding grouping information is updated, and the process goes on to step S315.

Figure 22:
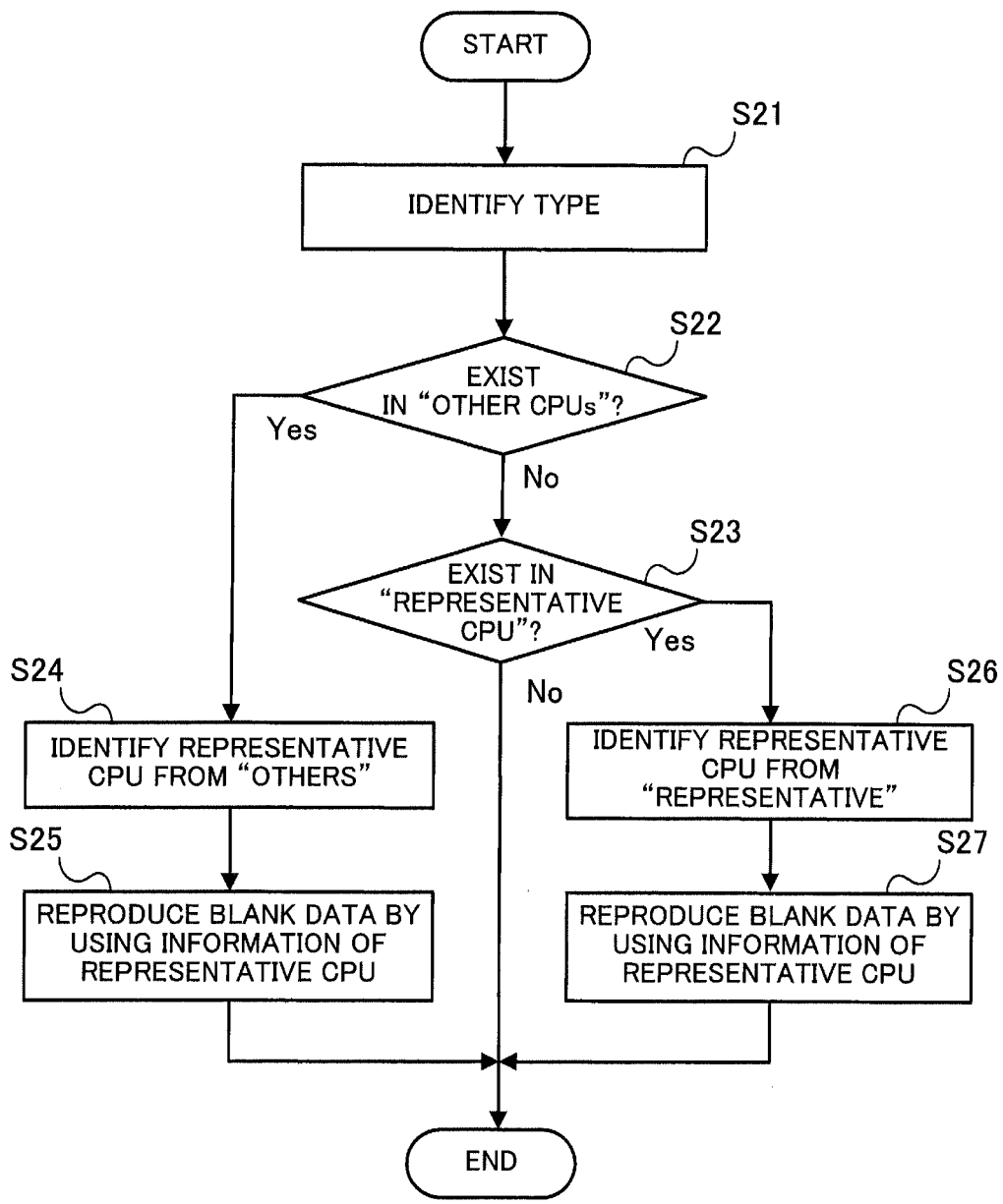
FIG. 22 is a flowchart illustrating a procedure for reproducing performance data by the manger.

With the above procedure, the grouping unit 112 re-forms the groups on the basis of the collected performance data. Then, when the transmission timing of transmitting the performance data of the CPUs other than a representative CPU according to similarity level comes, the preparation for transmitting the performance data of the CPUs other than the representative CPU and that of the representative CPU is made. If it is not such transmission timing, the preparation for transmitting only the performance data of the representative CPU is made FIG. 22 is a flowchart illustrating a procedure for reproducing performance data by a manger.

The manager 210 starts this process in response to a display request for displaying performance data from the operation management client 220.

At step S21, the performance data reproduction unit 214 identifies the type of a performance data table stored in the performance data database 213. Type 1 is that, in association with a representative CPU, the CPUs other than the representative CPU in a group are set as an "Other CPUs" data item.

The performance data table 2132 of FIG. 18 corresponds to this type 1. Type 2 is that, in association with a CPU that is a non-representative CPU, a representative CPU corresponding to the CPU is set as a "Representative CPU" data item. The performance data table 2131 of FIG. 16 corresponds to this type 2.

At step S22, it is determined whether or not a performance data table in question is of type 1 in which the CPUs other than the representative CPU are registered as the "Other CPUs" data item. If the performance data table is of type 1, the process goes on to step S24. Otherwise, the process goes on to step S23.

At step S23, since the data stored in the performance data database 213 is not of type 1, it is then determined whether or not the data is of type 2 in which the representative CPU of the group is set as the "Representative CPU" data item. If the data is of type 2, the process goes on to step S26. Otherwise, this process is completed.

At step S24, since the performance data table is of type 1, the representative CPU of the group in question is identified by checking the "Other CPUs" field of the performance data table stored in the performance data database 213.

At step S25, the performance data of the representative CPU of the group identified at step S24 is extracted. Then, the performance data of the CPUs other than the representative CPU, which are set as the other CPUs, is reproduced by using the extracted performance data, and then this process is completed.

At step S26, in the case of type 2, with reference to each CPU, a representative CPU is identified by referring to the "Representative CPU" field of the performance data table stored in the performance data database 213.

At step S27, the performance data of the representative CPU identified at step S26 is extracted. Then, the performance data of the corresponding CPUs, which has not been acquired, is reproduced by using the extracted performance data of the representative CPU, and then this process is completed.

With the above procedure, the performance data reproduction unit 214 is capable of reproducing the performance data of the CPUs other than the representative CPU of a group, which has not been acquired, and providing the performance data to an apparatus requesting the performance data, such as the operation management client 220. As a result, it becomes possible to provide reliable performance data even when the amount of data to be transmitted is reduced by reducing transmission of the performance data of the CPUs other than the representative CPU in a group formed according to characteristics.

The above processing functions can be realized by causing a computer. In this case, a program is prepared, which describes processes for the functions of the performance data collection apparatus and performance data management apparatus. A computer realizes the above processing functions by executing the program. The program describing the intended processes may be recorded on a computer-readable recording medium.

To distribute the program, portable recording media, such as Digital Versatile Discs (DVDs) and Compact Disc Read Only Memory (CD-ROMs), on which the program is recorded may be put on sale. Alternatively, the program may be stored in the storage device of a server computer and may be transferred from the server computer to other computers through a network.

A computer which is to execute the above program stores in its local storage device the program recorded on a portable recording medium or transferred from the server computer, for example. Then, the computer reads the program from the local storage device, and runs the program. The computer may run the program directly from the portable recording medium. Also, while receiving the program being transferred from the server computer, the computer may sequentially run this program.

According to the disclosed performance data collection method, performance data collection apparatus, and performance data management system, groups of processors whose performance data falls within a range of approximation are formed. Then, the transmission intervals for transmitting the performance data of the processors other than the representative processors in the groups are made longer than those for transmitting the performance data of the representative processors. As a result, the amount of performance data to be transmitted to a performance data management unit is reduced, thus making it possible to suppress adverse effects of the performance data management process on the system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A performance data collection method comprising a first procedure executed by a hardware processor of a computer, the first procedure including:

collecting performance data that is obtained by measuring a characteristic value of a logical processor of a hardware processor core when the logical processor executes a process, the logical processor corresponding to a unit of execution and being provided in plurality;

comparing the collected performance data of the plurality of logical processors with each other, forming a group of logical processors whose performance data falls within a predetermined range of approximation, selecting a representative processor of the group, and generating grouping information that indicates the logical processors of the group and the representative processor of the group in association with identification information of the group;

transmitting, to another computer, the performance data of the representative processor of the group at specified transmission intervals, and the performance data of logical processors other than the representative processor of the group at transmission intervals that are longer than the specified transmission intervals, with reference to the generated grouping information;

comparing, with reference to the grouping information, the performance data of the representative processor of the group with the performance data of the other logical processors of the group at evaluation intervals;

determining whether the performance data of the other logical processors of the group falls within the range of approximation to the performance data of the representative processor of the group, and when the performance data of the other logical processors falls within the range of approximation, obtaining a time period during which a similarity state continues where the performance data of the representative processor of the group and the performance data of the other logical processors of the group fall within the range of approximation, and calculating a similarity level representing a degree of similarity of the characteristic values of the logical processors belonging to the group on a basis of the time period during which the similarity state continues; and controlling the transmission intervals for transmitting the performance data of the other logical processors of the group to said another computer according to the similarity level.

2. The performance data collection method according to claim 1, wherein the forming of the group includes comparing, with reference to the grouping information, the performance data of a representative processor of an existing group already formed with the performance data of a representative processor of another existing group already formed or the performance data of a logical processor that does not belong to any groups, and when the performance data of the representative processor of said another existing group or the performance data of the logical processor that does not belong to any groups falls within the range of approximation to the performance data of the representative processor of the existing group, adding, to the existing group, logical processors of said another existing group or the logical processor that does not belong to any groups.

3. The performance data collection method according to claim 1, wherein the forming of the group includes, every time the performance data is collected, determining whether or not the collected performance data of a first logical processor and the collected performance data of a second logical processor fall within the range of approximation, and when a result indicating that the collected performance data of the first logical processor and the collected performance data of the second logical processor fall within the range of approximation is obtained a prescribed number of times in a row, forming a group of the first logical processor and the second logical processor.

4. The performance data collection method according to claim 1, wherein the forming of the group includes:
   determining whether the performance data of the other logical processors of the group falls within the range of approximation to the performance data of the representative processor of the group, and separating, from the group, a logical processor which is not the representative processor of the group and whose performance data is out of the range of approximation.

5. The performance data collection method according to claim 1, further comprising controlling the evaluation intervals for comparing the performance data of the representative processor of the group with the performance data of the other logical processors of the group, according to the similarity level.

6. The performance data collection method according to claim 1, wherein the transmission intervals of performance data of the other logical processors of the group and the evaluation intervals are controlled in such a way that, by using the specified transmission intervals and predetermined specified evaluation intervals as initial values, the transmission intervals of performance data of the other logical processors of the group and the evaluation intervals are increased according to an increase in the similarity level.

7. The performance data collection method according to claim 1, further comprising a second procedure executed by said another computer, the second procedure including:
   receiving the performance data of the representative processor that is transmitted at the specified transmission intervals, and the performance data of the other logical processors that is transmitted at transmission intervals that are longer than the specified transmission intervals;
   determining, in response to a read request for the performance data, whether a target logical processor specified in the read request is not the representative processor of the group and whether or not a target time period specified in the read request includes a blank period during which the performance data of the target logical processor was not acquired; and
   identifying the representative processor of the group with reference to the grouping information when the target logical processor has the blank period, and reproducing the performance data of the target logical processor of the blank period by using the performance data of the representative processor of the group collected during the blank period.

8. A performance data collection apparatus comprising one or plural processors configured to perform a procedure including:
   collecting performance data that is obtained by measuring a characteristic value of a logical processor of a processor core when the logical processor executes a process, the logical processor corresponding to a unit of execution and being provided in plurality;
   comparing the collected performance data of the plurality of logical processors with each other, forming a group of logical processors whose performance data falls within a predetermined range of approximation, selecting a representative processor of the group, and generating grouping information that indicates the logical processors of the group and the representative processor of the group in association with identification information of the group;
   transmitting, to another computer, the performance data of the representative processor of the group at specified transmission intervals, and the performance data of logical processors other than the representative processor of the group at transmission intervals that are longer than the specified transmission intervals, with reference to the generated grouping information;
   comparing, with reference to the grouping information, the performance data of the representative processor of the group with the performance data of the other logical processors of the group at evaluation intervals;
   determining whether the performance data of the other logical processors of the group falls within the range of approximation to the performance data of the representative processor of the group, and when the performance data of the other logical processors falls within the range of approximation, obtaining a time period during which a similarity state continues where the performance data of the representative processor of the group and the performance data of the other logical processors of the group fall within the range of approximation, and calculating a similarity level representing a degree of similarity of the characteristic values of the logical processors belonging to the group on a basis of the time period during which the similarity state continues; and
   controlling the transmission intervals for transmitting the performance data of the other logical processors of the group to said another computer according to the similarity level.

9. A computer-readable, non-transitory medium encoded with a computer program, the computer program causing a computer to perform a procedure comprising:
   collecting performance data that is obtained by measuring a characteristic value of a logical processor of a processor core when the logical processor executes a process, the logical processor corresponding to a unit of execution and being provided in plurality;

comparing the collected performance data of the plurality of logical processors with each other, forming a group of logical processors whose performance data falls within a predetermined range of approximation, selecting a representative processor of the group, and generating grouping information that indicates the logical processors of the group and the representative processor of the group in association with identification information of the group;

transmitting, to another computer, the performance data of the representative processor of the group at specified transmission intervals, and the performance data of logical processors other than the representative processor of the group at transmission intervals that are longer than the specified transmission intervals, with reference to the generated grouping information;

comparing, with reference to the grouping information, the performance data of the representative processor of the group with the performance data of the other logical processors of the group at evaluation intervals;

determining whether the performance data of the other logical processors of the group falls within the range of approximation to the performance data of the representative processor of the group, and when the performance data of the other logical processors falls within the range of approximation, obtaining a time period during which a similarity state continues where the performance data of the representative processor of the group and the performance data of the other logical processors of the group fall within the range of approximation, and calculating a similarity level representing a degree of similarity of the characteristic values of the logical processors belonging to the group on a basis of the time period during which the similarity state continues; and controlling the transmission intervals for transmitting the performance data of the other logical processors of the group to said another computer according to the similarity level.

10. A performance data management system comprising:

a first computer configured to perform a first procedure including:

collecting performance data that is obtained by measuring a characteristic value of a logical processor of a processor core when the logical processor executes a process, the logical processor corresponding to a unit of execution and being provided in plurality;

comparing the collected performance data of the plurality of logical processors with each other, forming a group of logical processors whose performance data falls within a predetermined range of approximation, selecting a representative processor of the group, and generating grouping information that indicates the logical processors of the group and the representative processor of the group in association with identification information of the group; and transmitting, with reference to the generated grouping information, the performance data of the representative processor of the group at specified transmission intervals, and the performance data of logical processors other than the representative processor of the group at transmission intervals that are longer than the specified transmission intervals; and a second computer configured to perform a second procedure including:

receiving the performance data that is transmitted from the first computer;

receiving a read request for the performance data, identifying the representative processor of the group with reference to the grouping information when a target logical processor specified in the read request is not the representative processor of the group and a target time period specified in the read request includes a blank period during which the performance data of the target logical processor was not acquired; and reproducing the performance data of the target logical processor of the blank period by using the performance data of the identified representative processor of the group collected during the blank period.

* * * * *